United States Patent
Gajiwala et al.

(10) Patent No.: US 11,579,695 B2
(45) Date of Patent: *Feb. 14, 2023

(54) SYSTEM AND METHOD FOR GENERATING SOUND EFFECTS ON FINGERTIPS WITH PIEZOELECTRIC ACTUATORS OF A HAPTIC KEYBOARD

(71) Applicant: Dell Products, LP, Round Rock, TX (US)

(72) Inventors: Priyank Gajiwala, Austin, TX (US); Michiel Knoppert, Amsterdam (NL); James H. Hallar, Austin, TX (US); Thomas M. Hinskens, Utrecht (NL); Frank van Valkenhoef, Hertogenbosch (NL)

(73) Assignee: Dell Products, LP, Round Rock, TX (US)

( * ) Notice: Subject to any disclaimer, the term of this patent is extended or adjusted under 35 U.S.C. 154(b) by 406 days.

This patent is subject to a terminal disclaimer.

(21) Appl. No.: 16/779,565

(22) Filed: Jan. 31, 2020

(65) Prior Publication Data
US 2021/0240267 A1   Aug. 5, 2021

(51) Int. Cl.
*H04N 5/44* (2011.01)
*G06F 3/01* (2006.01)
(Continued)

(52) U.S. Cl.
CPC ............ *G06F 3/016* (2013.01); *G06F 3/0219* (2013.01); *G06F 3/0414* (2013.01); *H04R 17/00* (2013.01)

(58) Field of Classification Search
CPC ...... G06F 3/016; G06F 3/0219; G06F 3/0414; G06F 3/04847; G06F 3/0202; H04R 17/00; H04R 2400/03; H04R 2499/15
See application file for complete search history.

(56) References Cited

U.S. PATENT DOCUMENTS 4,618,797 A   10/1986   Cline
4,633,123 A * 12/1986   Radice ............... H03K 17/9643
                                                          341/5
(Continued)

FOREIGN PATENT DOCUMENTS

JP   2014164610 A   9/2014
KR   100442116 B1   7/2004
(Continued)

OTHER PUBLICATIONS

Rekimoto, J., et al., "PreSensell: Bi-directional Touch and Pressure Sensing Interactions with Tactile Feedback," Apr. 2006, 6 pages.
(Continued)

*Primary Examiner* — Munear T Akki
(74) *Attorney, Agent, or Firm* — Prol Intellectual Property Law, PLLC; H. Kenneth Prol

(57) ABSTRACT

A haptic keyboard of an information handling system may comprise a coversheet to identify a key location, a support layer, a contact foil placed between the coversheet and support layer, and a controller operatively coupled to the contact foil. The controller may receive a haptic actuation indicator signal via a processor or via the contact foil, send a first haptic feedback control signal to a first piezoelectric element to cause the first piezoelectric element to generate haptic tactile movement feedback at the key location, and send a second haptic feedback control signal to the first or a second piezoelectric element to cause the second piezoelectric element to generate haptic sound feedback in response to the haptic actuation indicator signal.

20 Claims, 8 Drawing Sheets

(51) Int. Cl.
  *H04R 17/00* (2006.01)
  *G06F 3/041* (2006.01)
  *G06F 3/02* (2006.01)

(56) References Cited

U.S. PATENT DOCUMENTS

| | | |
|---|---|---|
| 4,857,887 A | 8/1989 | Iten |
| 5,463,388 A | 10/1995 | Boie |
| 5,825,352 A | 10/1998 | Bisset |
| 5,861,583 A | 1/1999 | Schediwy |
| 5,887,995 A | 3/1999 | Holehan |
| 6,147,680 A | 11/2000 | Tareev |
| 6,188,391 B1 | 2/2001 | Seely |
| 6,239,790 B1 | 5/2001 | Martinelli |
| 6,532,824 B1 | 3/2003 | Ueno |
| 6,574,095 B2 | 6/2003 | Suzuki |
| 6,680,731 B2 | 1/2004 | Gerpheide |
| 6,703,550 B2 | 3/2004 | Chu |
| 6,822,635 B2 | 11/2004 | Shahoian |
| 6,882,337 B2 | 4/2005 | Shetter |
| 7,336,260 B2 | 2/2008 | Martin |
| 7,439,962 B2 | 10/2008 | Reynolds |
| 7,486,279 B2 | 2/2009 | Wong |
| 7,523,410 B2 | 4/2009 | Rekimoto |
| 7,535,454 B2 | 5/2009 | Jasso |
| 7,741,979 B2 | 6/2010 | Schlosser |
| 7,808,488 B2 | 10/2010 | Martin |
| 8,144,453 B2 | 3/2012 | Brown |
| 8,159,461 B2 | 4/2012 | Martin |
| 8,164,573 B2 | 4/2012 | DaCosta |
| 8,199,033 B2 | 6/2012 | Peterson |
| 8,248,277 B2 | 8/2012 | Peterson |
| 8,248,278 B2 | 8/2012 | Schlosser |
| 8,279,052 B2 | 10/2012 | Heubel |
| 8,294,600 B2 | 10/2012 | Peterson |
| 8,294,677 B2 | 10/2012 | Wu |
| 8,373,664 B2 | 2/2013 | Wright |
| 8,477,113 B2 | 7/2013 | Wu |
| 8,508,487 B2 | 8/2013 | Schwesig |
| 8,542,134 B2 | 9/2013 | Peterson |
| 8,581,710 B2 | 11/2013 | Heubel |
| 8,633,916 B2 | 1/2014 | Bernstein |
| 8,674,941 B2 | 3/2014 | Casparian |
| 8,749,507 B2 | 6/2014 | DaCosta |
| 8,773,356 B2 | 7/2014 | Martin |
| 8,797,295 B2 | 8/2014 | Bernstein |
| 8,842,091 B2 | 9/2014 | Simmons |
| 9,178,509 B2 | 11/2015 | Bernstein |
| 9,274,660 B2 | 3/2016 | Bernstein |
| 9,280,248 B2 | 3/2016 | Bernstein |
| 9,318,006 B2 | 4/2016 | Heubel |
| 9,336,969 B2 | 5/2016 | Takashima |
| 9,400,582 B2 | 7/2016 | Bernstein |
| 9,477,342 B2 | 10/2016 | Daverman |
| 9,535,557 B2 | 1/2017 | Bernstein |
| 9,829,982 B2 | 11/2017 | Bernstein |
| 10,089,840 B2 | 10/2018 | Moussette |
| 10,120,450 B2 | 11/2018 | Bernstein |
| 10,860,112 B1 | 12/2020 | Knoppert |
| 2004/0020754 A1* | 2/2004 | Sullivan ............... H01H 13/702 200/314 |
| 2006/0109255 A1 | 5/2006 | Chen |
| 2007/0063987 A1 | 3/2007 | Sato |
| 2007/0152974 A1* | 7/2007 | Kim ....................... G06F 3/016 345/168 |
| 2007/0273671 A1 | 11/2007 | Zadesky |
| 2008/0098456 A1 | 4/2008 | Alward |
| 2008/0202824 A1 | 8/2008 | Philipp |
| 2008/0259046 A1 | 10/2008 | Carsanaro |
| 2009/0002178 A1 | 1/2009 | Guday |
| 2009/0243817 A1 | 10/2009 | Son |
| 2009/0315853 A1* | 12/2009 | Yang .................... G06F 3/0446 345/174 |
| 2009/0315854 A1 | 12/2009 | Matsuo |
| 2010/0089735 A1 | 4/2010 | Takeda |
| 2010/0102830 A1 | 4/2010 | Curtis |
| 2010/0110018 A1 | 5/2010 | Faubert |
| 2010/0128002 A1 | 5/2010 | Stacy |
| 2012/0062491 A1 | 3/2012 | Coni |
| 2012/0092263 A1 | 4/2012 | Peterson |
| 2013/0249802 A1 | 9/2013 | Yasutake |
| 2014/0300551 A1* | 10/2014 | Purcocks ............. H01H 13/702 345/168 |
| 2014/0340208 A1* | 11/2014 | Tan ......................... G06F 3/016 340/407.2 |
| 2014/0340209 A1* | 11/2014 | Lacroix ................... H04R 3/14 381/98 |
| 2015/0185842 A1 | 7/2015 | Picciotto |
| 2015/0338886 A1* | 11/2015 | Seo ....................... G06F 1/1669 361/679.09 |
| 2017/0269688 A1 | 9/2017 | Chan |
| 2018/0074694 A1 | 3/2018 | Lehmann |
| 2019/0073036 A1 | 3/2019 | Bernstein |

FOREIGN PATENT DOCUMENTS

| | | |
|---|---|---|
| KR | 20040081697 A | 9/2004 |
| WO | 2004/042685 A2 | 5/2004 |
| WO | 2004/042693 A1 | 5/2004 |
| WO | 2005/057546 A1 | 6/2005 |
| WO | 2011/056752 A1 | 5/2011 |
| WO | 2011/071837 A2 | 6/2011 |

OTHER PUBLICATIONS

Rekimoto, J. et al., "PreSense: Interaction Techniques for Finger Sensing Input Devices," UIST '03 Vancouver, BC, Canada, Nov. 2003, pp. 203-212, ACM 1-58113-636-6/03/0010.

Holleis, P. et al., "Studying Applications for Touch-Enabled Mobile Phone Keypads," Proceedings of the Second International Conference on Tangible and Embedded Interaction (TEI'08), Feb. 18-20, 2008, Bonn, Germany, pp. 15-18.

Westerman, W. et al., "Multi-Touch: A New Tactile 2-D Gesture Interface for Human-Computer Interaction," Proceedings of the Human Factors and Ergonomics Society 45th Annual Meeting, Oct. 2001, pp. 632-636.

* cited by examiner

SYSTEM AND METHOD FOR GENERATING SOUND EFFECTS ON FINGERTIPS WITH PIEZOELECTRIC ACTUATORS OF A HAPTIC KEYBOARD

FIELD OF THE DISCLOSURE

The present disclosure generally relates to a key switch assembly of, for example, an information handling system. The present disclosure more specifically relates to generation of haptic sound feedback and haptic movement feedback at one or more piezoelectric elements of a haptic keyboard assembly.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a keyboard or other input or output devices such as cursor control devices for manual input of information by the user.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
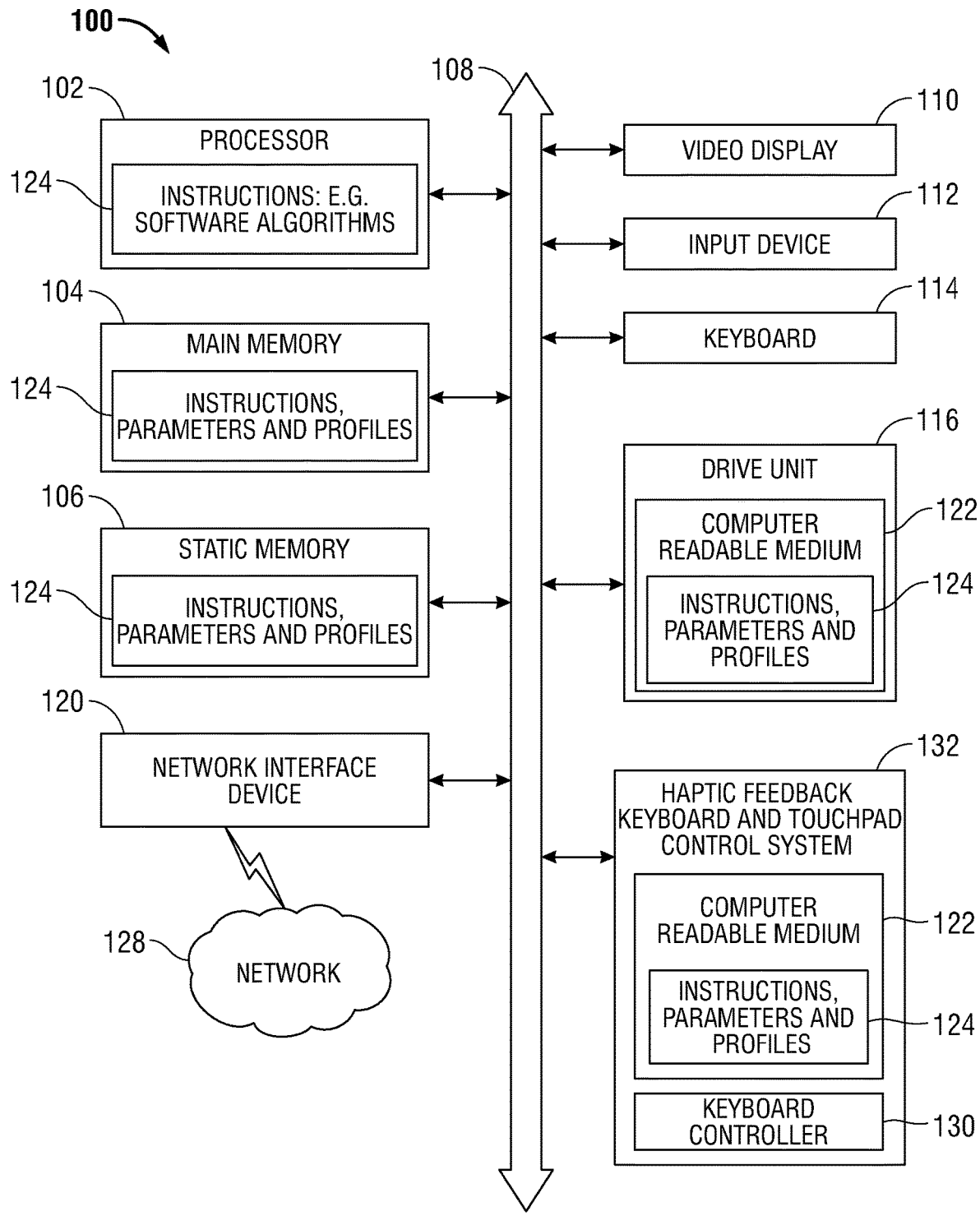
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

User demand drives the market for mobile information handling systems toward ever-slimmer, more lightweight laptop devices, prompting a need for ever-thinner keyboards and laptop bases. A solid-state piezoelectric keyboard provides a thinner, more light-weight improvement over traditional scissor mechanism keyboards. The use of piezoelectric elements within the keyboard may eliminate the use of other devices such as a scissor mechanism that are used to maintain a keycap of a key above an electrical connection or for a dive board type mechanism under a touchpad. Instead, such piezoelectric elements may reduce or eliminate those mechanical elements that may fail after a number of actuations while also reducing the thickness of the keyboard or the touchpad itself. Instead of the keys of the keyboard requiring travel of a scissor mechanism within a C-cover of the information handling system, the relatively thinner keys defined (either physically or visibly) on the solid-state keyboard of the presently-described information handling system may reduce the physical thickness of the keyboard within the information handling system. Further, the solid-state touchpad may eliminate the dive board mechanism and underlying click switch for selection of items via the mechanically actuated touchpad. This may enable a thinner, more streamlined information handling system.

Embodiments of the present disclosure provide for a keyboard of an information handling system. The keyboard may include, in an embodiment, a coversheet to identify an actuation location of an input actuation device. In an embodiment a support layer may be placed underneath the coversheet to support the coversheet and other layers within the keyboard. The keyboard may, in an embodiment, include a contact foil placed between the coversheet and support layer. In the embodiments presented herein, the keyboard may include a piezoelectric element placed between the contact foil and support layer to receive an applied mechanical stress at the actuation location of the input actuation device. The keyboard of the information handling system, in an embodiment, may include a controller of the information handling system operatively coupled to the contact foil to receive a haptic actuation indicator signal (e.g., a piezo actuation signal) in the form of an electric charge from the piezoelectric element placed under the mechanical stress. The haptic actuation indicator signal may indicate to the controller that a responsive haptic event (e.g., haptic sound feedback or haptic movement feedback) is appropriate. The controller may send a responsive haptic feedback control signal to the piezoelectric element varying in polarity, voltage or current to cause the piezoelectric element to provide haptic feedback at the actuation location.

During operation of the solid-state keyboard or touchpad of the information handling system described in embodiments herein, a key on the keyboard or the touchpad may be actuated by a user pressing down on a specific location. In an embodiment, this specific location may be visually indicated by an alphanumeric symbol such as those found on a QWERTY keyboard, a key pedestal or raised location, or another designation such as a tactile frame or depression in a cover sheet. The actuations of these specific locations by, for example, a user's finger causes a mechanical stress to be applied to the piezoelectric element resulting in the deformation of the piezoelectric element. Upon application of this mechanical stress and the deformation of the piezoelectric element, the piezoelectric element accumulates an electric charge that is passed to a controller of the information handling system in the form of a piezo actuation signal via the contact foil described herein. In an embodiment, the controller receives the piezo actuation signal and sends an electrical charge in the form of a haptic feedback control signal back to the piezoelectric element. Upon application of the haptic feedback control signal on the piezoelectric element by the controller, the piezoelectric element may be mechanically stretched or compressed so as to create a tactile haptic feedback event such as the piezoelectric element warping up or down and returning to its pre-deformed state. This warping of the layers of the piezoelectric element causes the user to additionally hear an audible haptic sound (e.g., click, or buzz) in some embodiments, and feel a haptic sensation at the actuated key or the specific location where the user pressed in order to actuate a key or touchpad. This audible haptic sound and haptic feedback against the user's finger causes a sensation of pressing a mechanical key thereby creating a feeling and sound effect to a user that the key was pressed or that a touchpad has been clicked to select an item such as one displayed on a display screen. Various haptic feedback may be utilized in embodiments herein to generate any variety of tactile haptic feedback sensations or a variety of audio feedback signals. In particular embodiments, the operating software applications may determine the type of tactile haptic feedback sensations or audio feedback utilized.

The haptic feedback control signal in embodiments described herein may be a haptic movement feedback control signal causing haptic movement feedback at one or more piezoelectric elements, a haptic sound feedback control signal causing haptic sound feedback at one or more piezoelectric elements, or a combined haptic feedback control signal causing both haptic sound feedback and haptic movement feedback at a single piezoelectric element, as described directly above. In other embodiments described herein, the controller may transmit a haptic movement feedback control signal to a first piezoelectric element to cause haptic movement feedback (tactile sensations felt by the user's finger) at a first location on the haptic keyboard, touchpad, or palm rest, and transmit a separate haptic sound feedback control signal to a second piezoelectric element. The haptic sound feedback control signal in such an example embodiment may cause haptic sound feedback (e.g., click, buzz) at a second location on the haptic keyboard, touchpad, or palm rest. In such a way, the controller may cause two separate piezoelectric elements to provide haptic movement feedback and haptic sound feedback in tandem, and in response to a single received haptic actuation indicator signal (e.g., a piezo actuation signal).

In some embodiments of the present disclosure, such an audible haptic response may be generated in response to a received haptic actuation indicator signal, other than the piezo actuation signal received by the controller indicating the piezoelectric element has been deformed under mechanical stress. For example, the controller may transmit a haptic feedback control signal causing a piezoelectric element to generate a haptic sound feedback in response to receiving a notification from a software application currently running on the information handling system. Such a notification or alarm from the software application may be played via one or more piezoelectric elements in lieu of, or in addition to an audible sound played through the audio speakers of the information handling system in embodiments described herein. As another example, the controller may transmit the haptic feedback control signal to generate a haptic sound feedback at one or more piezoelectric elements in response to receiving an audio signal with surround-sound capabilities. Such an audio signal in an embodiment may include multiple audio channel signals, including a right channel signal intended to play sound associated with video or images playing toward the right-hand side of the screen and a left channel signal intended to play sound associated with video or images playing toward the left-hand side of the screen. One or more piezoelectric elements or groups thereof in embodiments described herein may also be mapped to the right channel signal or the left channel signal. In such embodiments, the controller may transmit a haptic sound feedback control signal in response to the right channel signal or the left channel signal to the one or more piezoelectric elements mapped to that channel. These one or more piezoelectric elements in embodiments described herein may make audible sound upon receipt of the haptic sound feedback control signal in response to receipt by the controller of the audio signal.

The overall thickness of the information handling system may be reduced so as to decrease the size and weight of the information handling system. In other embodiments, because the keyboard described herein has a reduced thickness, the space within the information handling system used to house other components, such as a battery, of the information handling system may be increased allowing for the increase in size of these components or the inclusion of additional components within the chassis of the information handling system. Additionally, because the solid-state keyboard described herein does not include the mechanical components (i.e., scissor mechanism and coupled key cap or dive board mechanism) as other keyboards or touchpads, the keyboard may be less susceptible to wear or mechanical strain over time. Instead, the solid-state keyboard of embodiments herein use fewer mechanical parts and may be more robust, resulting in longer usable life.

Turning now to the figures, FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system may include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 may include one or more storage devices, one or more communications ports for communicating with external devices, as well as, various input and output (I/O) devices 112, such as a keyboard 114, a touchpad, one or more speakers, one or more microphones, ambient light sensors, a mouse, a video/graphic display 110, or any combination thereof. The information handling system 100 may also include one or more buses operable to transmit communications between the various hardware components. Portions of an information handling system 100 may themselves be considered information handling systems 100.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, or other memory of computer readable medium 122 storing instructions 124 of the haptic feedback keyboard and touchpad control system 132, and drive unit 116 (volatile (e.g. random-access memory, etc.), nonvolatile memory (read-only memory, flash memory etc.) or any combination thereof. A processor 102 may further provide the information handling system with a system clock for which a time of day clock may be tracked along with any location detector such as global positioning system or in coordination with a network interface device 120 connecting to one or more networks 128. The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input), and a keyboard 114. Various drivers and control electronics may be operatively coupled to operate input devices 112 such as the haptic keyboard 114 and haptic touchpad according to the embodiments described herein. Further, the information handling system 100 may include input/output devices 112, such as a one or more speakers or one or more microphones use along with the keyboard 114 of embodiments according to the present disclosure. Various drivers and control electronics may be operatively coupled to operate input devices 112 such as the speakers, microphones, as well as the haptic keyboard 114 and haptic touchpad according to the embodiments described herein.

The network interface device shown as wireless adapter 120 may provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links.

Wireless adapter 120 may connect to any combination of macro-cellular wireless connections including 2G, 2.5G, 3G, 4G, 5G or the like. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 may communicate voice, video or data over the network 128. Further, the instructions 124 may be transmitted or received over the network 128 via the network interface device or wireless adapter 120.

The information handling system 100 may include a set of instructions 124 that may be executed to cause the computer system to perform any one or more of the methods or computer-based functions disclosed herein. For example, instructions 124 may execute a haptic feedback keyboard and touchpad control system 132, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the haptic feedback keyboard and touchpad control system 132 may include a computer-readable medium 122 in which one or more sets of instructions 124 such as software may be embedded. Similarly, main memory 104 and static memory 106 may also contain a computer-readable medium for storage of one or more sets of instructions, parameters, or profiles 124 including haptic feedback modulation instructions that allow for a user to input a desired level of haptic feedback at a key or location on a touchpad. The disk drive unit 116 and static memory 106 may also contain space for data storage. Further, the instructions 124 may embody one or more of the methods or logic as described herein. For example, instructions relating to the haptic feedback keyboard and touchpad control system 132 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100.

Main memory 104 may contain computer-readable medium, such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The haptic feedback keyboard and touchpad control system 132 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the haptic feedback keyboard and touchpad control system 132 that may be operably connected to the bus 108. The haptic feedback keyboard and touchpad control system 132 computer readable medium 122 may also contain space for data storage. The haptic feedback keyboard and touchpad control system 132 may, according to the present description, perform tasks related to receiving an electric charge from a piezoelectric element and return a haptic feedback control signal to that piezoelectric element causing a haptic feedback at a key of the keyboard 114 associated with that piezoelectric element. In these embodiments, the haptic feedback keyboard and touchpad control system 132 may receive an electric charge (e.g., a piezo actuation signal) from any of a plurality of piezoelectric elements each associated with a key on keyboard 114 (i.e., a QWERTY keyboard), a key pad, or a location on a touchpad. Input may be received by the haptic feedback keyboard and touchpad control system 132 either simultaneously or concurrently so as to provide a return haptic feedback control signal to the corresponding piezoelectric elements as described herein. The haptic feedback control signal may provide tactile or audio feedback to the actuated piezoelectric element or piezoelectric elements according to some embodiments herein. In other embodiments, a separate haptic feedback control signal for tactile movement feedback may be provided to the actuated piezoelectric element or piezoelectric elements while another haptic feedback control signal for audio feedback may be provided to other piezoelectric elements such as adjacent piezoelectric elements to the actuated piezoelectric elements or located elsewhere according to some embodiments herein.

In an embodiment of the present description, each of the keys of keyboard 114 may be associated with a piezoelectric element. The piezoelectric element may be used to, as described herein, create an electrical charge (e.g., piezo actuation signal) relative to a key on the keyboard 114 and send that electrical charge to a controller 130. In an embodiment, the controller may receive the piezo actuation signal and send a haptic feedback control signal to the piezoelectric element. Upon application of the haptic feedback control signal at the piezoelectric element (i.e., having a specific current and voltage) associated with the actuated key of keyboard 114 causes the piezoelectric element to convert that haptic feedback control signal into a mechanical stress by, for example, causing the piezoelectric element to warp upward or warp downward. The mechanical stress of the piezoelectric element due to the application of the haptic feedback control signal to the piezoelectric element may be felt or heard by a user who actuated the key of keyboard 114.

In an embodiment, the keyboard controller 130 may execute instructions, parameter, and profiles 124 to enact the functions of the keyboard 114 as described herein. The haptic feedback keyboard and touchpad control system 132 in an embodiment may include one or more sets of instructions that, when executed by a keyboard controller 130, causes a current, at a voltage, to be applied to a piezoelectric element upon detection of an electrical charge (e.g., a piezo actuation signal or other type of haptic actuation indicator signal) from the piezoelectric element. The one or more sets of instructions of the haptic feedback keyboard and touchpad control system 132 may also include one or more sets of instructions that, when executed by the keyboard controller 130, determines which of any plurality of keys of keyboard 114 were activated. In an example, the keyboard controller 130 may receive, from a piezoelectric element, an electric charge (e.g., a piezo actuation signal) and produce a haptic feedback control signal to the piezoelectric element.

In an embodiment, the haptic feedback keyboard and touchpad control system 132 may also include one or more sets of instructions that, when executed by a controller 130, a processor, or both, adjusts the polarity, voltage, or current of haptic feedback control signals applied to any piezoelectric element. This adjustment may be completed based on the desired haptic responses from the piezoelectric elements, the lifespan of the piezoelectric element, the electrical characteristics of the piezoelectric element, the mechanical characteristics of the piezoelectric element, or combinations thereof. Because these characteristics may be different from one piezoelectric element to the other, the haptic feedback control signal applied to any given piezoelectric element by the keyboard controller 130 may be customized to produce a specific level of haptic feedback (e.g., haptic movement feedback or haptic sound feedback) at any given key of keyboard 114. In an embodiment, the keyboard controller 130 of the information handling system 100 may access one or more look-up tables (e.g., movement look-up table or sound look-up table). In this embodiment, the keyboard controller 130 of the information handling system 100 may access the look-up tables in order to determine characteristics (e.g., voltage magnitude, frequency, polarity) of a haptic feedback control signal to be applied to any given piezoelectric element to achieve known, user-specified, or learned (e.g., by a neural network) haptic movement intensity levels, haptic sound volume levels, or both.

The one or more sets of instructions of the haptic feedback keyboard and touchpad control system 132 may also include one or more sets of instructions that, when executed by the keyboard controller 130, causes any number of subsequent voltage pulses to be applied to any piezoelectric element. In this embodiment, the subsequent electrical pulses may cause a haptic feedback event to a user who actuated a key of keyboard 114 or changes in magnitude or pulses of haptic feedback to emulate the feel of a mechanical keystroke including adjustment of the feel of depth of the haptic-emulated keystroke. In other embodiments, the haptic feedback of the keyboard 114 may not need to emulate a keystroke of a mechanically actuated keyboard but instead provide a distinct haptic feel to indicate that a keystroke has occurred on the solid-state keyboard 114 to the user. Further, the haptic feedback of the keyboard 114 may include audio feedback form the actuated piezoelectric element or other piezoelectric elements of the keyboard 114 in various embodiments.

In an embodiment, the application of any current and voltage applied to any of the piezoelectric elements associated with any of the keys of keyboard 114 may be dependent on an application being executed by the processor 102. By way of example, a user may be engaged in providing input, via the keys of the keyboard 114, to a processor 102 in order to cause output to be provided. In a specific embodiment, the information handling system 100 may execute a basic input/output system (BIOS). Upon execution of the BIOS, the haptic feedback keyboard and touchpad control system 132 may begin to detect electrical signals (e.g., a piezo actuation signals) emitted from a piezoelectric element being placed in a strain by the actuation of a corresponding key on the keyboard 114. This may allow the haptic feedback keyboard and touchpad control system 132 to receive input at times when the information handling system 100 is in an on state. In an alternative embodiment, the execution of other application programs by a processor 102 of the information handling system 100, such as word processing application program or email program, may trigger the haptic feedback keyboard and touchpad control system 132 to begin to detect and discern haptic actuation indicator signals (e.g., notifications associated with running applications, piezo actuation signals produced at any given piezoelectric element, or multi-channel audio signals) to generate haptic feedback control signals to yield tactile or sound haptic feedback from one or more piezoelectric elements in the keyboard 114 depending on the operating application program. By deferring input received from the piezoelectric element at the keyboard controller 130 or any other controller or processor, accidental input may be prevented by any errant touch of the keyboard 214.

In an embodiment, the haptic feedback keyboard and touchpad control system 132 may communicate with the main memory 104, the processor 102, the video display 110, the alphanumeric input device 112, and the network interface device 120 via bus 108, and several forms of communication may be used, including ACPI, SMBus, a 24 MHZ BFSK-coded transmission channel, or shared memory. Keyboard or touchpad driver software, firmware, controllers and the like may communicate with applications on the information handling system 100. Similarly, speaker or microphone driver software, firmware, controllers and the like may communicate with applications on the information handling system 100 as well as with the piezo keyboard driver in some embodiments herein.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
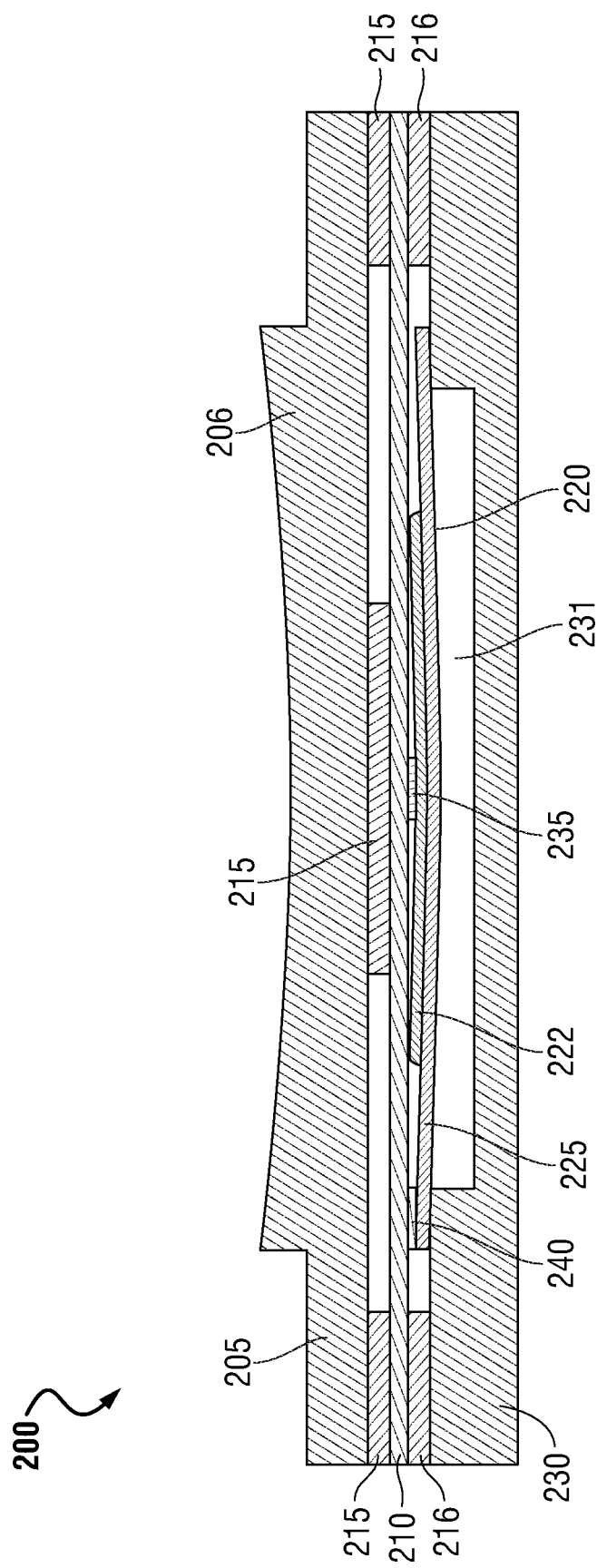
FIG. 2 is a side cut-out view of a key of a keyboard implementing a piezoelectric element according to an embodiment of the present disclosure.

FIG. 2 is a side cut-out view of a key 200 of a haptic feedback keyboard implementing a piezoelectric element according to an embodiment of the present disclosure. As described herein, one or more layers of the keyboard in embodiments of the present disclosure may provide a haptic sound feedback or audible notifications by deforming a piezo element such that it generates audible sound waves in addition to tactile haptic feedback according to embodiments of the present disclosure.

According to an embodiment, the key 200 may be formed of a plurality of layers, one layer of which is a piezoelectric element 220. Although FIG. 2 shows a cross-sectional view of a single key 200, the present specification contemplates that a keyboard may also include a plurality of these similar keys 200 arranged as, for example, a QWERTY-type keyboard.

Consequently, FIG. 2 is not intended to be limiting but merely intended as a description of operation of any type of input device contemplated by the present disclosure.

The key 200 includes a coversheet 205. The coversheet 205 may be made of any type of elastically resilient material. The elastically resilient material may allow, at least, a portion of the key 200 to be deformed upon application of a pressure from a user's finger. Upon withdrawal of the pressure from the user's finger, the material the coversheet 205 is made of allows the coversheet 205 of the key 200 to bend back to its pre-deformed state. In an embodiment, the resilient material may allow the coversheet 205 to travel a minimal distance and still deform a piezoelectric element 220. For example, a distance of between 0.01 mm and 2 mm. In an embodiment, the distance is between 0.05 mm and 0.15 mm. In an embodiment, the distance is 0.1 mm.

In an embodiment, the shape of the coversheet 205 may have a selection of key pedestals 206 of various sizes and shaped so as to conform to a user's finger. In an embodiment, in order to shape the coversheet 205, the material used to form the coversheet 205 may be subjected to an injection molding process. As such, a top portion of the coversheet 205 may be formed to be ergonomically beneficial to a user's actuation such as by conforming to the user's fingers and including a pedestal 206 to highlight the key location, for example. In other embodiments, no key pedestals may be formed and a key location may be described in coversheet 205 via markings, depressions, key framing, or other methods. The injection molding process may be completed prior to the installation of the coversheet 205 into the remaining layers within the keyboard 200 as described herein. Any number of processes may be included with the injection molding process. In an embodiment, the injection molding process used to form the coversheet 205 may include forming a number of holes within a translucent sheet of acrylonitrile butadiene styrene (ABS). These holes may correlate with a number of keys on a keyboard. The formation of the coversheet 205 may continue with injection molding a translucent ABS through the holes to form a raised portion correlating with each of the number of keys on the keyboard. Opposite the raised portions a number of runners may be machined away to accommodate for receipt of other layers of the keyboard such as each of the piezoelectric elements. The surface of the coversheet on which the raised portions are formed may be painted and any number or type of graphics may be laser etched on each raised portion indicating a specific key of the keyboard.

In other embodiments, the coversheet of the C-cover may include a plurality of vias for keys 200 having a cover sheet 205 or cap for each key. A key pedestal 206 for each key 200 in a solid-state keyboard of the present embodiments may be disposed through the vias in the C-cover in such embodiments. Each haptic key of the haptic keyboard in such an embodiment may include a cover layer with portions similar to those described directly above that protrudes through the key vias in the coversheet 205. Layering under the coversheet may include material layers that are hydrophobic or have other properties. Though gaps between haptic keys and key vias may be minimized, such gaps may be useful for cooling ventilation of the base chassis or for allowing backlighting to frame the haptic keys. Similarly, a touchpad top touch interface layer may be attached under the coversheet 205 to seamlessly provide a designated touchpad area in the C-cover coversheet 205. Any combination of continuous coversheet for haptic keys and vias in the coversheet for placement of haptic keys of a keyboard coversheet layer are contemplated in various embodiments. Further, it is contemplated that in some embodiments one or the other of a haptic keyboard or haptic touchpad may be used with a keyboard having mechanically actuated or a touchpad with a mechanically actuated diving board mechanism.

The key 200 may further include a number of adhesive layers 215 that physically couple the various layers of the key 200 together. In an embodiment, a first adhesive layer 215 may be formed on the coversheet 205 to adhere the coversheet 205 to the contact foil 210. The first adhesive layer 215 may include the placement of the adhesive at locations that may enhance the movement and prevent the hindrance of the actuation of the coversheet 205. In a specific embodiment, the first adhesive layer 215 may include placing the adhesive along borders of the key 200 as well as placing the adhesive at a central location of the key 200.

The contact foil 210 may be adhered to the coversheet 205 and may be made of any elastically resilient material that, when the coversheet 205 of key 200 is actuated or the contact foil 210 is bent towards a lower portion of the key 200, returns to its original state when the key 200 is no longer being actuated. The contact foil in an embodiment may be a flexible material, such as polyethylene terephthalate (PET) serving as a polyester printed circuit board or other type of flexible printed circuit board, in several example embodiments. The contact foil 210 may include a number of metal traces formed on one or more of its surfaces that electrically and communicatively couple each of the corresponding piezoelectric element 220 of key 200 to a keyboard controller such as a processor of an information handling system that includes a haptic feedback keyboard control system such as described herein. Formation of metal traces may be made according to a variety of methods including photolithographic techniques for applying metal or lamination of copper strips or other metal layers.

In an embodiment, portions of the contact foil 210 may be physically coupled to a support plate 230 via a second layer of adhesive 216. The location of the placement of the second adhesive layer 216 may include placing the adhesive along borders of the key 200.

In an embodiment presented herein, the piezoelectric element 220 may include a first portion 222 that may be any solid piezoelectric material that accumulates an electric charge when a mechanical stress is applied to it or specifically, in the embodiments presented herein, when the solid material is deformed. Solid materials used to form the piezoelectric element 220 may include crystals, ceramics, or protein layers, among other types of materials. For ease of explanation, the piezoelectric element 220 may be made of a type of ceramic although the present specification contemplates the use of other types of piezoelectric materials.

The piezoelectric element 220 may be housed over a cavity 231 formed in the support plate 230. The piezoelectric element 220 may comprise two portions 222 and 225 each electrically coupled via electric contact points such as soldering points 235 and 240, respectively, to a different electrical trace on the surface of the contact foil 210. The first portion 222 may be a ceramic disc in an embodiment. Second portion 225 of the piezoelectric element 220 may be a metal plate or ring, such as a brass plate, that extends beyond the edges of cavity 231. The first portion 222 and the second portion 225 may be operatively coupled via adhesive including conductive adhesives. The soldering points 235 and 240 may be silver solder contact points for operative electrical coupling to metal traces on the surface of contact foil 210. As so oriented, the first soldering point 235 and second soldering point 240 may be formed to receive an electrical charge (e.g., a piezo actuation signal) upon deflection of the piezoelectric element 220 as a user actuates the key 200. The brass plate 225 supports deflection of the piezoelectric element 220 into the cavity 231 to detect mechanical actuation of the key 200. In an embodiment, the support plate 230 may have a cavity 230 formed therein such that the piezoelectric element 220 may be allowed to be deflected therein when the key 200 is actuated by a user and cavity 231 may be an aperture or hole through support plate 230 or may be a depression or hole in support plate 230 that does not pass through 230.

In an embodiment presented herein, the piezoelectric element 220 may be any solid material that accumulates an electric charge when a mechanical stress is applied to it or specifically, in the embodiments presented herein, the solid material is deformed. Solid materials used to form the piezoelectric disk 222 or other piezoelectric material as part of a first portion 222 of the piezoelectric element 220 may include crystals, ceramics, biological matter, protein layers, among other types of materials. For ease of explanation, the piezoelectric disk material 222 may be made of a type of ceramic although the present specification contemplates the use of these other types of materials.

During operation of the key 200, the contact foil 210 may transmit the piezo actuation signal from the piezoelectric element 220 via the metal traces that conduct the electrical charge to the keyboard controller or other processor associated with the key 200. For example, as the piezoelectric disk material 222 is compressed by deflection and the metal plate or ring 225 warped downward toward the cavity 231 within support plate 230, a change in voltage may be detected. The piezo actuation signal (electrical charge) created when the user actuates the key 200 and the piezoelectric element 220 is subjected to a mechanical stress may be detected between soldering points 235 and 240. The piezo actuation signal (electrical charge) may be communicated down metal traces formed on the contact foil 210 to a controller (not shown).

The metal traces formed on the contact foil 210 may further be used to conduct a return haptic feedback control signal from the controller to the piezoelectric element 220 so that the voltage and current of the haptic feedback control signal may cause the piezoelectric element 220 to return to a planar piezoelectric element 220 or otherwise move, as required to cause a specified haptic response (e.g., haptic movement feedback or haptic sound feedback) felt or heard by the user via coversheet 205. For example, this haptic feedback control signal may have a certain voltage, current, and polarity (−,+) sufficient to render the piezoelectric material of the piezoelectric element 220 to cause a haptic movement or sound. Such a haptic feedback control signal may be a sine wave, a square wave, a pulsed signal, or other waveform of changing current, voltage, or polarity applied to the piezoelectric element 220. This application of voltage in the haptic feedback control signal may cause an upward or downward warping of the piezoelectric element 220, and consequently, a haptic feedback (e.g., haptic movement feedback or haptic sound feedback) presented at the key 200 via the contact foil 210, adhesive 215, and coversheet 205 that the user may feel or hear. Upon receiving a piezo actuation signal, the controller in an embodiment may send the haptic feedback control signal back to the piezoelectric element 220 via the metal traces formed on the contact foil 210, through the soldering points 235 and 240 and to a conductive layer of metallic plate or ring 225 formed below the piezoelectric disk material 222.

Such a haptic feedback control signal, such as a sine wave signal, or other haptic feedback control signals with varying polarities, frequencies, or voltage (magnitude or amplitude) and current may be used by the keyboard controller to create the haptic feedback (e.g., haptic sound feedback or haptic movement feedback) felt or heard by the user as described herein. In these embodiments, the piezo actuation signal sent from the piezoelectric element 220 to the keyboard controller and the haptic feedback control signal sent from the controller to the piezoelectric element 220 may propagate along the two metal traces formed on a surface of the contact foil 210. The contact foil 210 may therefore, in an embodiment, include double the number of metal traces on at least one of its surface as that of the number of piezoelectric elements 220 used to form a keyboard that includes multiple keys 200. This haptic feedback may be relayed to the user within microseconds of the user actuating the key 200 such that the user physically detects a sensation or hears an audible sound indicating that the key 200 was pressed. This sensation felt or heard by the user may be present despite no actual mechanical devices such as a scissor mechanism or other types of keyboard mechanical devices being present among the layers of the key 200. The haptic feedback control signal to the piezoelectric element 220 may vary in magnitude and pulsing to create the desired haptic feedback (e.g., haptic sound feedback or haptic movement feedback) at key 200.

FIG. 2 shows an image of a single key 200. The present specification contemplates that a plurality of keys 200 may be formed alongside each other in order to form, for example, a number pad, a keyboard, or a combination thereof. Consequently, although the features of the key 200 depicted in FIG. 2 apply to a single key 200, the present specification contemplates that any number of keys 200 may be formed on the keyboard so as to allow for the formation of an input device such as a keyboard. The keys 200 may be of any size (e.g., spacebar, tab key, or the like) and depending on size may include more than one piezoelectric element 220 associated with it. As the user actuates each of the keys 200, a haptic feedback (e.g., haptic sound feedback or haptic movement feedback) may be felt or heard by the user so as to present to the user a sensation that the key was pressed. This operation of key 200 may be conducted every time the user actuates the key 200. In some embodiments, the haptic sound feedback operation of key 200 may also be conducted separately from actuation of the key 200, as a user notification.

The formation of the key 200 may, in the embodiments presented herein, provide for a keyboard that has a relatively shorter distance of key travel as compared to piezoelectric haptic keyboards that comprise two separate contact foil layers, and as compared to those keyboards that implement mechanical devices such as a scissor mechanisms and key caps. In an embodiment, the distance of travel of the key 200 may be smaller than 0.1 mm. With the shorter distance of key travel, the overall thickness of the keyboard placed within an information handling system may be reduced. This increases the available footprint within a base chassis of, for example, a notebook-type information handling system that may be used for more or larger components (e.g., batteries) to be placed within the base chassis. Additionally, or alternatively, the reduction in thickness of the keyboard may reduce the overall thickness of the information handling system improving the aesthetics of the design of the information handling system. This reduction in size of the information handling system may also result in the reduction of the size or weight of the information handling system thereby increasing the portability of the information handling system by the user.

The keys 200 of the present embodiments also include no moving mechanical parts. With the absence of mechanical moving parts, the key 200 of the presently described embodiments may be relatively more robust thereby increasing the useful life of the key 200. This may increase user satisfaction over the useful lifetime of the information handling system.

Figure 3A:
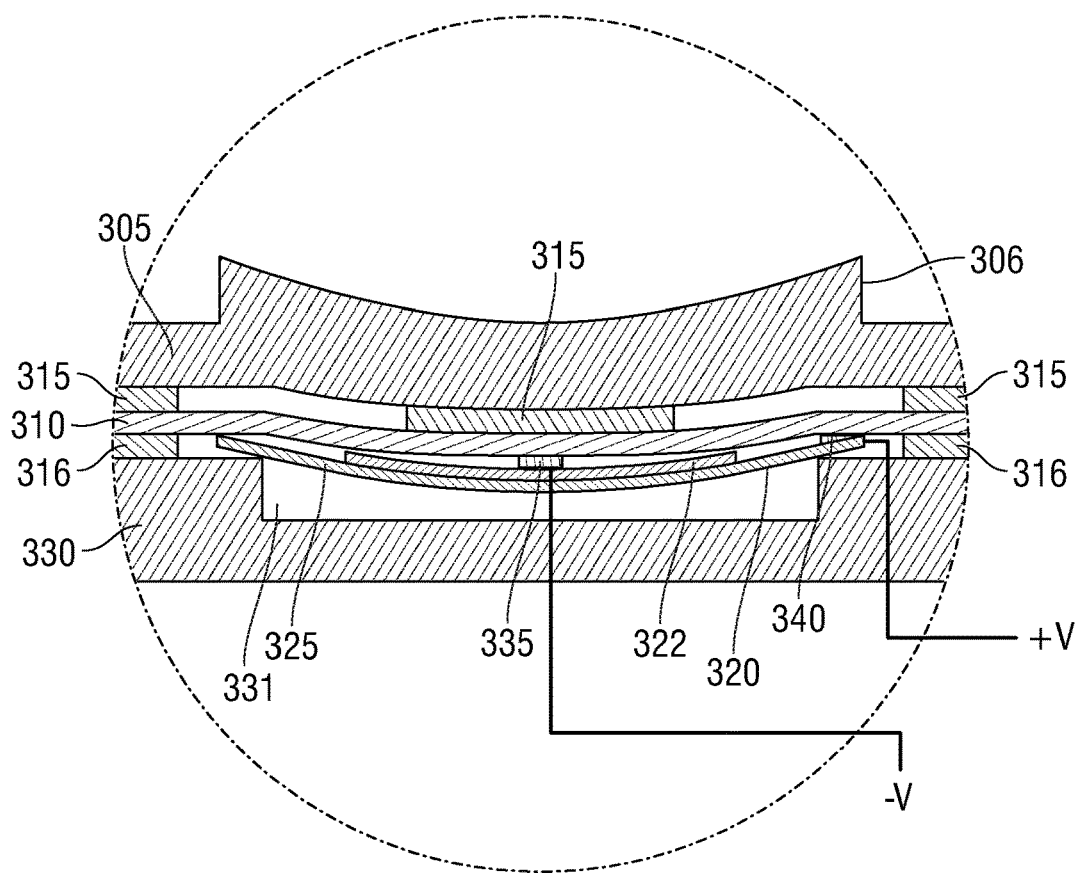
FIG. 3A is a side cut-out view of a key of a keyboard implementing a piezoelectric element in a downward warped position according to an embodiment of the present disclosure.

FIG. 3A is a side cut-out view of a key 300 of a haptic feedback keyboard implementing a piezoelectric element in a downward warped position according to an embodiment of the present disclosure. As described herein, a haptic feedback control signal may be transmitted from the controller to the piezoelectric element to a piezoelectric element of a haptic keyboard to cause a haptic movement or sound. For example, upon receiving a haptic actuation indicator signal indicating a haptic movement or sound is needed, the controller (not shown) in an embodiment may send a haptic feedback control signal to the piezoelectric element 320 via the metal traces formed on the contact foil 310, through the soldering points 335 and 340 and to a conductive layer of metallic plate or ring 325 formed below the piezoelectric disk material 322. Such a haptic actuation indicator signal in an embodiment may be a piezo actuation signal received at the controller or processor, indicating a key situated above the piezoelectric element 320 has been actuated by a user, as described in greater detail with respect to FIG. 2. In other embodiments, a haptic actuation indicator signal may comprise a notification or code instructions received at the processor or controller from a software application currently operating on the information handling system. For example, some applications may include alarms or notifications that may be set to make an audible sound via the haptic keyboard, rather than through the main speaker system of the information handling system. As another example, some applications may cause the haptic keyboard, in lieu of or in combination with the main speakers of the information handling system to emit sound in accordance with an audio signal having one or more channels for one or more speakers. Such notifications or audio signals in an embodiment may comprise a haptic actuation indicator signal.

The conductive layer of metallic plate or ring 325 may apply the haptic feedback control signal to the piezoelectric disk material 322 so as to cause the piezoelectric disk material 322 to stretch or shrink depending on the polarity of the signal applied. For example, a negative voltage haptic feedback control signal applied to piezoelectric disk material element 322 at soldering point 335 relative to a positive voltage haptic feedback control signal applied at soldering point 340 may cause piezoelectric disk 322 to compress or shrink in embodiments herein. This may, in turn, cause the metallic layer or disk 325 adhered to the ceramic piezoelectric disk 322 to warp downward. Further in the example shown in FIG. 3B, a positive voltage haptic feedback control signal applied to piezoelectric disk material element 322 at soldering point 335 relative to a negative voltage haptic feedback control signal applied at soldering point 340 may cause piezoelectric disk 322 to expand or stretch in embodiments herein. This may, in turn, cause the metallic layer or disk 325 adhered to the ceramic piezoelectric disk 322 to warp upward. The principle of haptics applied to the piezoelectric disk 322 includes an input voltage that is applied through the two electrodes (voltage change as sine wave, square wave etc.) to generate movement on piezoelectric material 322 of the piezoelectric element 320 and a warping of the metallic layer or disk 325. The haptic feedback control signal in an embodiment may comprise a haptic movement feedback control signal for causing haptic movement feedback at the piezoelectric element 322, a haptic sound feedback control signal for causing haptic sound feedback at the piezoelectric element 322 through one or more frequencies of upward and downward movement, or a single haptic feedback control signal for causing both haptic movement feedback and haptic sound feedback, simultaneously, at the piezoelectric element 322.

This haptic movement feedback control signal in an embodiment may be used to cause a haptic movement feedback such as a depression and return of the key 300 or a tactile "click" or movement of a touchpad. The haptic sound feedback control signal may be used to cause a haptic sound feedback such as an audible clicking or buzzing sound. For example, movement of the piezoelectric element 320 from a planar or neutral position to an upward or downward position, or between an upward warped position and downward warped position may generate audible sound waves. The pitch and volume of such sound waves in an embodiment may depend, at least partially, on various adjustable aspects (e.g., frequency, magnitude, polarity of voltage) of the haptic feedback control signal. Such a haptic sound feedback control signal, such as a sine wave signal, or other haptic feedback control signals with varying polarities or voltage and current may be used by the keyboard controller to create the haptic feedback (e.g., haptic movement feedback or haptic sound feedback) felt or heard by the user as described herein.

Figure 3B:
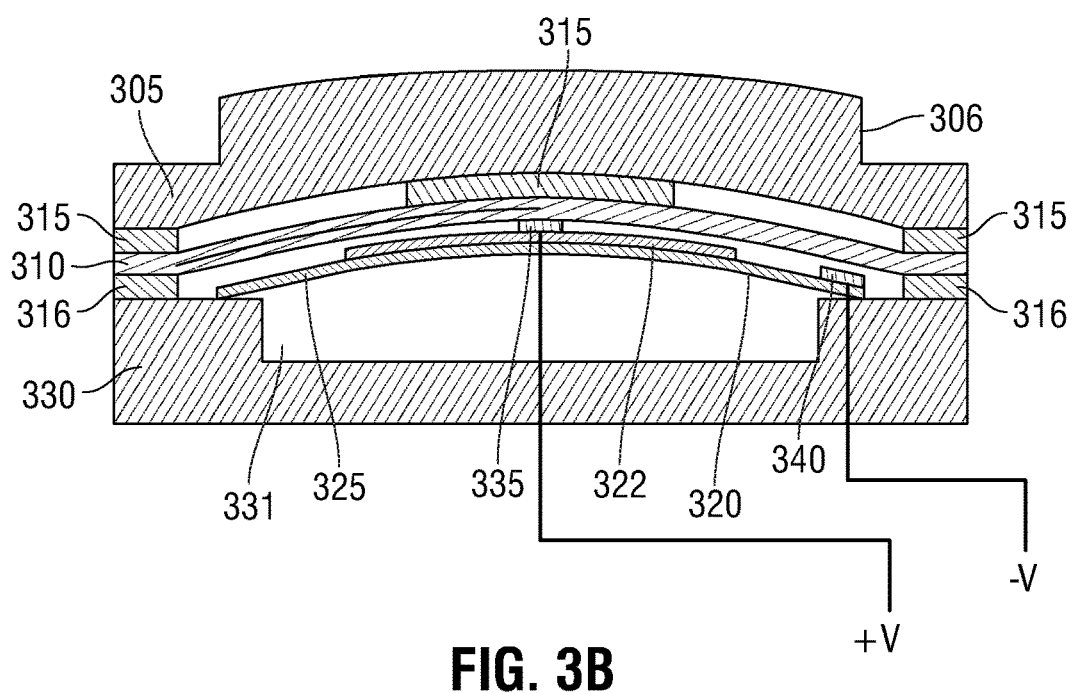
FIG. 3B is a side cut-out view of a key of a keyboard implementing a piezoelectric element in an upward warped position according to an embodiment of the present disclosure.

FIG. 3B is a side cut-out view of a key 300 of a haptic feedback keyboard implementing a piezoelectric element in an upward warped position according to an embodiment of the present disclosure. As described herein, upon receiving a piezo actuation signal or other haptic actuation indicator signal, the controller (not shown) in an embodiment may send a haptic feedback control signal to the piezoelectric element 320 via the metal traces formed on the contact foil 310, through the soldering points 335 and 340 and to a conductive layer of metallic plate or ring 325 formed below the piezoelectric disk material 322 to cause a haptic movement feedback or haptic sound feedback. The conductive layer of metallic plate or ring 325 may apply the haptic feedback control signal to the piezoelectric disk material 322 so as to cause the piezoelectric disk material 322 to stretch or shrink depending on the polarity of the signal applied. For example, reversing polarity of voltage applied by a haptic feedback control signal to the piezoelectric disk 322 as described with reference to FIG. 3A may cause the piezoelectric disk 322 to compress or shrink and metallic plate 325 may warp upwards. More specifically, a positive voltage haptic feedback control signal applied to piezoelectric disk material element 322 at soldering point 335 relative to a negative voltage haptic feedback control signal applied at soldering point 340 may cause piezoelectric disk 322 to stretch or expand in embodiments herein. This may, in turn, cause the metallic layer or disk 325 adhered to the ceramic piezoelectric disk 322 to warp upward. By oscillating the voltage (e.g., reversing polarity) of the haptic feedback control signals applied to the soldering points 335 and 340 in such a way, the controller in an embodiment may cause the piezoelectric element 320 to move between its upward warped position and downward warped positions as shown in FIGS. 3A and 3B. Such a movement of the metallic plate or disc 325 in an embodiment may generate audible sound waves at various frequencies and magnitude of the haptic feedback control signal to the piezoelectric elements. Additionally, the warping of the piezoelectric elements as described may be used to generate tactile haptic feedback events as well via haptic feedback control signals in embodiments herein.

The sound generated by such movement of the piezoelectric element 320 in an embodiment may have a higher frequency or volume than that achievable by linear resonant actuators or eccentric rotating mass haptic feedback systems. The sound volume created by the piezoelectric element 320 in an embodiment may depend, at least partially, on the amplitude at which the voltage applied to the soldering points 335 and 340 is oscillated (e.g., the magnitude of the voltage supplied at the soldering points 335 and 340). For example, a higher voltage amplitude or magnitude applied at soldering points 335 and 340 may result in a higher sound pressure, and thus, a higher audible volume of sound.

In some embodiments, the oscillating voltage applied to soldering points 335 and 340 may be driven at a resonant frequency of the piezoelectric element 320. In other words, the rate at which the voltage polarities applied at soldering points 335 and 340 are switched or oscillated may match a known resonant or natural frequency for the material of which the ceramic disc 322, metallic ring 325, or other components of the piezoelectric element 320 are comprised. This may cause the metallic ring 325 to move from its upward warped to downward warped positions at the resonant frequency of the metallic ring 325. The volume of the sound generated by application of oscillating voltage at soldering points 335 and 340 in an embodiment may also depend upon the frequency at which the voltage is applied, and thus, the frequency of the vibration of the metallic ring 325 as it moves from its upward warped to downward warped positions. Thus, the volume of sound generated by the piezoelectric element 320 may be decreased by either increasing the frequency of voltage oscillation beyond the natural frequency of the metallic ring 325 or decreasing the frequency of voltage oscillation below this natural frequency. The maximum volume achievable by such an oscillating voltage may be associated with voltage delivered at the natural frequency of the material of which the ceramic disc 322, metallic ring 325, or other components of the piezoelectric element 320 are comprised in an embodiment.

Such a change in frequency of voltage oscillation in an embodiment may effectively change the volume of sound generated thereby, even if the voltage amplitude or magnitude remains constant. As described herein, the magnitude of voltage applied by the controller to the piezoelectric element 320 at the soldering points 335 and 340 in an embodiment may affect the degree to which the piezoelectric element 320 warps upward or downward, and thus, the degree of haptic movement feedback felt by the user. Because the volume of the sound generated by such a movement of the piezoelectric element 320 may be controlled, at least partially, by altering the frequency of voltage oscillation without altering the magnitude of voltage applied, the volume of sound generated by movement of the piezoelectric element 320 may be controlled somewhat independently from the haptic movement feedback felt by the user. In other words, two different haptic feedback control signals having identical voltage magnitudes, but two different voltage frequencies may cause a piezoelectric element 320 to generate identical haptic movement feedbacks, but different haptic sound feedbacks. Thus, the user may be able to vary the volume of haptic sound feedback without affecting the intensity of the haptic movement feedback and may vary the haptic movement feedback without varying the volume of haptic sound feedback associated therewith in an embodiment.

The controller in an embodiment may determine the polarity, frequency, and magnitude of voltage to be applied within a haptic feedback control signal by accessing a haptic sound look-up table. Such a look-up table may provide one or more voltage magnitudes that may be applied in order to generate audible sound at a sound volume level for each of a plurality of piezoelectric elements in an embodiment. For example, such a look-up table may provide a first voltage magnitude that may be applied at a resonant frequency of the piezoelectric element to meet a sound volume level. As described herein, the volume may be increased in an embodiment by applying a voltage at such a resonant frequency, without adjusting the magnitude of the applied voltage. Thus, such a look-up table may also provide one or more additional voltage magnitudes that may be applied at non-resonant frequencies to also meet the same sound volume level. In some embodiments, the sound volume level may be associated with a range of combinations of voltage amplitudes and frequencies.

Figure 6:
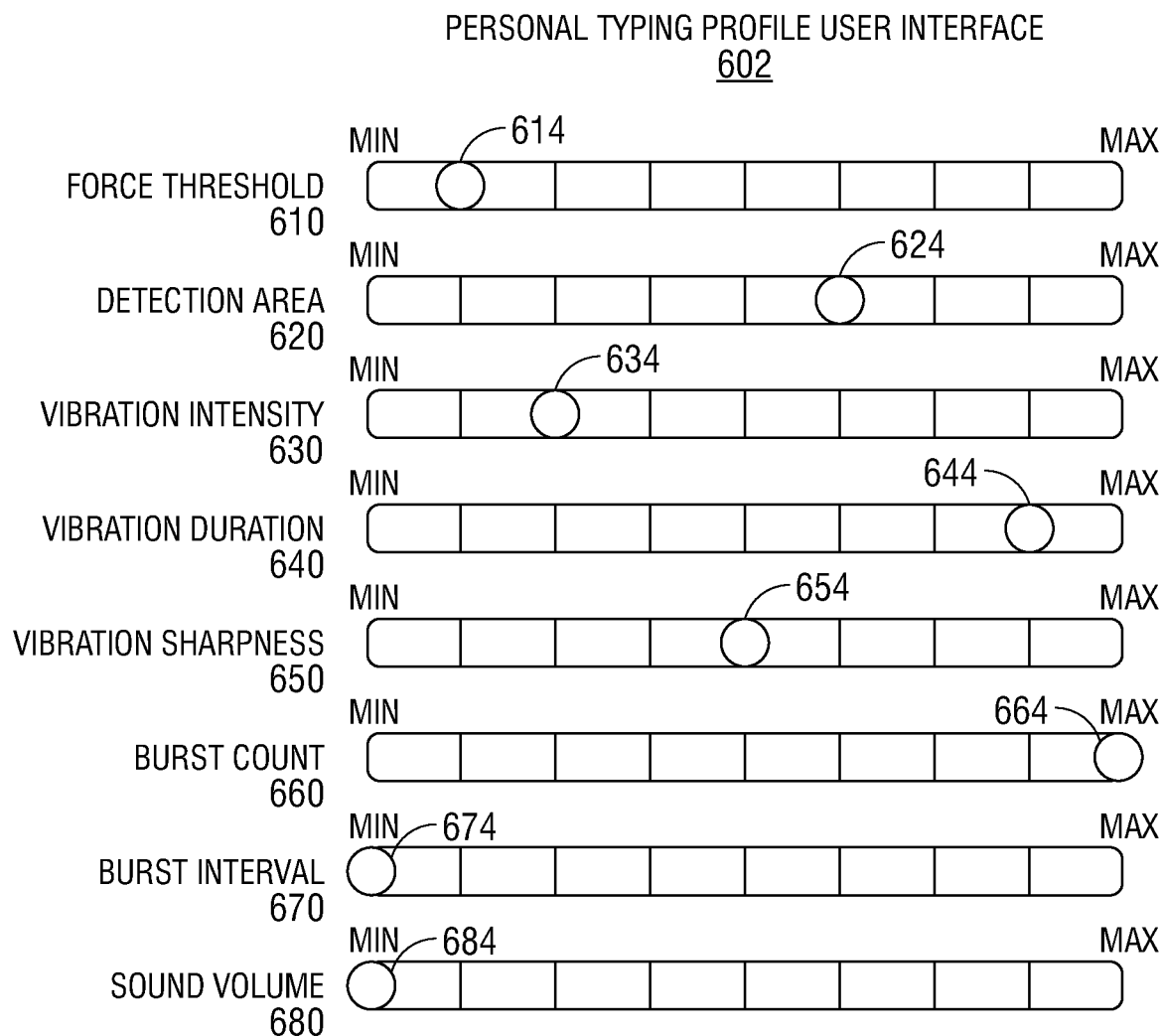
FIG. 6 is a graphical diagram illustrating a personal typing profile graphical user interface according to an embodiment of the present disclosure.

The sound volume level and movement intensity level in one embodiment may be set according to user input received from a graphical user interface, as described in greater detail with respect to FIG. 6. In other embodiments, sound volume level and movement intensity level may be set through a machine learning process in which a typing profile machine learning module may determine optimal haptic keyboard settings (e.g., movement intensity level and sound volume level) based on one or more indicators of current operating conditions, user behavior or mood, or conditions of the surrounding environment. Although embodiments described herein may refer to user-specified movement intensity level and user-specified sound volume level, such as the known values received via the graphical user interface, other embodiments contemplate a processor or controller causing one or more piezoelectric elements to generate haptic movement feedback or haptic sound feedback meeting movement intensity levels and sound volume levels determined by the machine learning neural network to be optimal for a given set of conditions.

In some embodiments, a piezoelectric element 320 may have a movement intensity level and sound volume level (e.g., as set by the user, as determined by an operating software application, or by a predictive machine learning algorithm) that does not utilize a single piezoelectric element for both movement and sound or cannot be simultaneously achieved by activating a single piezoelectric element. In one example embodiment, a design choice for utilization of sound feedback with a piezo haptic keyboard of embodiments herein may have a user, an operating application, or predictive machine learning algorithm for a customized user typing profile adopt setting such that separate piezoelectric elements are used for tactile haptic feedback events from those used for sound haptic feedback events. In other example embodiments, a user, an operating application, or a neural network may choose a movement intensity level (e.g., a force with which the controller causes the ceramic disc 322 and metallic plate 325 to warp upward or downward) that is associated with a first voltage magnitude, and choose a sound volume level that is associated with a second voltage magnitude, or a range of voltage magnitudes. If the first voltage magnitude does not match the second voltage magnitude, or fall within the range of voltage magnitudes associated with the sound volume level, a single piezoelectric element may not be capable of simultaneously providing the desired haptic movement feedback and using that movement to generate the desired haptic sound feedback in accordance with the sound volume level. For example, the user may choose a relatively low movement intensity level associated with a polarity swing voltage between negative 50V and positive 50V. The same user may choose a relatively high sound volume level associated with a polarity swing voltage between negative 100V and positive 100V. In other example embodiments, the volume level chosen may be associated with a polarity swing voltage that is less than the range of polarity swing for the movement intensity level. For example, the polarity swing associated with the user-specified sound volume level may be between negative 25V and positive 25V.

As described herein, the volume of the haptic sound feedback may be increased in an embodiment by adjusting the magnitude of voltage applied, or by adjusting the frequency of the voltage polarity switches applied. However, if the voltage or frequency is already set to the natural frequency of the material of which the ceramic disc 322, metallic ring 325, or other components of the piezoelectric element 320 are comprised, the volume of the haptic sound feedback may be limited and only be increased further by increasing the magnitude of voltage applied. In an embodiment in which the greater voltage magnitude or a different frequency is required to achieve the sound and volume level that is incompatible with the voltage or frequency required to meet the movement or movement intensity level, or other haptic setting levels, the controller may send a first haptic feedback control signal (e.g., a haptic movement feedback control signal) to the piezoelectric element situated beneath the key that was actuated by a user to allow the user to feel the haptic movement feedback at that key, while concurrently or near simultaneously sending a second haptic control signal (e.g., a haptic sound feedback control signal) to one or more piezoelectric elements situated beneath nearby or surrounding keys to also allow the user to hear the haptic sound feedback at the desired sound or sound volume level near the actuated key.

Figure 4:
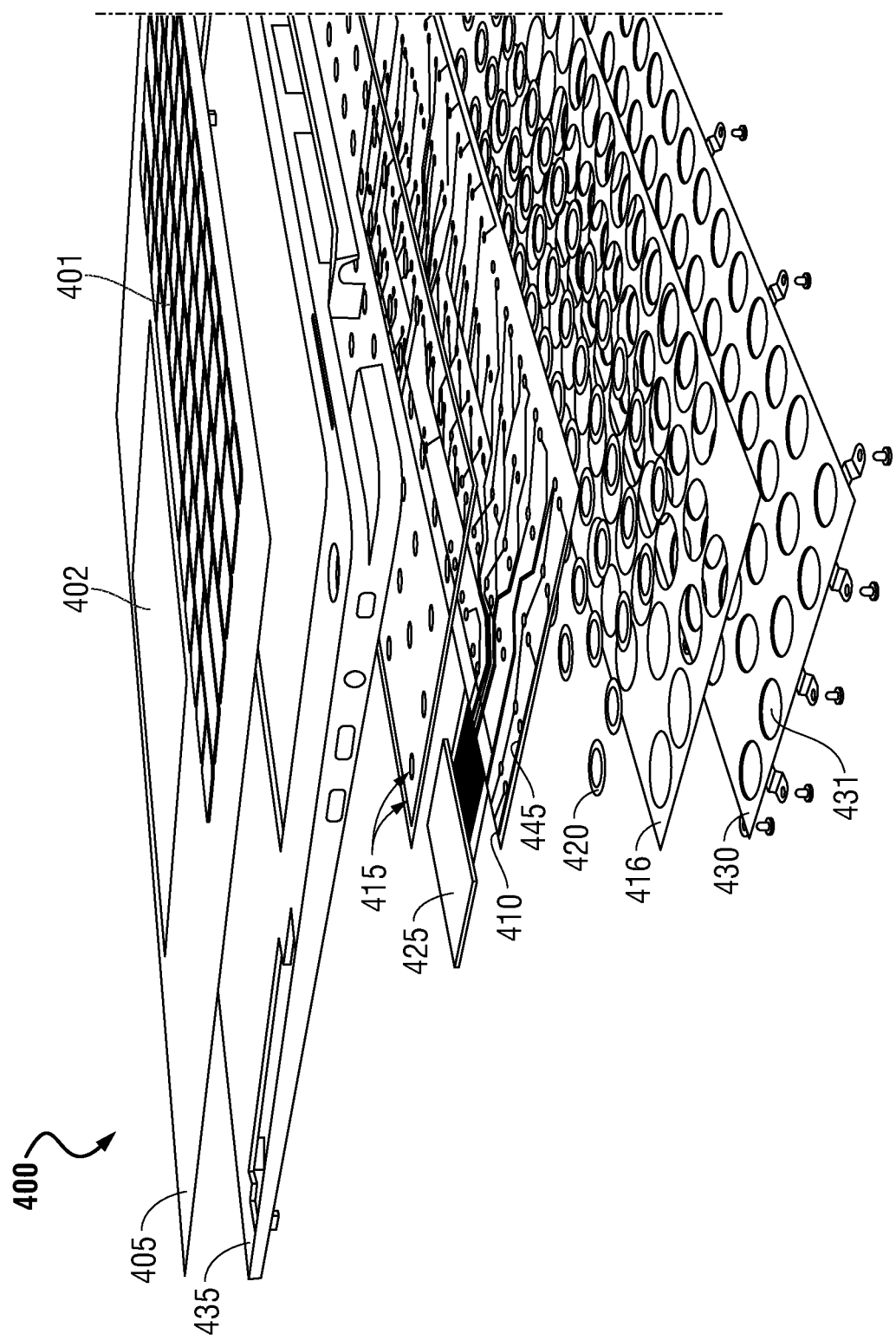
FIG. 4 is an exploded perspective view of a keyboard stack up for of an information handling system according to an embodiment of the present disclosure.

FIG. 4 is an exploded perspective view of a keyboard stack up 400 of an information handling system according to an embodiment of the present disclosure. The keyboard stack up 400 shows a plurality of keys, similar to those described in connection with FIG. 2, arranged so as to receive input from a user at multiple keys. FIG. 4 also shows a top coversheet 405 having both a keyboard 401 and a touchpad 402. Either or both of the keyboard 401 and touchpad 402 may be haptic systems as described in embodiments herein. In an embodiment, the keys may be arranged similar to a QWERTY design of a keyboard 401. However, other arrangements of any alphabetic, numeric, or symbolic keys is contemplated by the present description.

The keyboard stack up 400 may include several layers similar to those described in connection with FIG. 2, 3A, or 3B. In an embodiment, the keyboard stack up 400 includes a coversheet layer 405. The coversheet layer 405 may be made of any type of elastically resilient material. Coversheet layer 405 may include a plurality of key designations, such as key pedestals as shown in keyboard 401 and a touchpad 402 area designation. The elastically resilient material may allow, at least, a portion of the coversheet layer 405 to be deformed upon application of a pressure from a user's finger. Upon withdrawal of the pressure from the user's finger, the material the coversheet layer 405 is made of allows the coversheet layer 405 of the key to bend back to its pre-deformed form.

In an embodiment, in order to shape the coversheet 405, the material used to form the coversheet 405 may be subjected to an injection molding process completed prior to the installation of the coversheet 405 into the remaining layers within the keyboard 400 as described herein. Any number of processes may be included with the injection molding process, including forming a number of holes correlated with a number of keys 401 on the keyboard 400 within a translucent sheet of ABS, and injection molding a translucent ABS through the holes to form a raised portion correlating with each of the number of keys 401 on the keyboard 400. Opposite the raised portions a number of runners may be machined away to accommodate for receipt of other layers of the keyboard such as each of the piezoelectric elements 420.

In other embodiments, the coversheet of the C-cover 435 may include a plurality of vias for keys 401 having a cover sheet 405 or cap for each key 401. A key pedestal for each key 401 in a solid-state keyboard of the present embodiments may be disposed through the vias in the C-cover 435 in such embodiments. Each haptic key of the haptic keyboard in such an embodiment may include a cover layer similar to those described directly above that protrudes through the key vias in the coversheet 405. Layering under the coversheet may include material layers that are hydrophobic or have other properties. Though gaps between haptic keys and key vias may be minimized, such gaps may be useful for cooling ventilation of the base chassis or for allowing backlighting to frame the haptic keys. Similarly, a touchpad 402 top touch interface layer may be attached under the coversheet 405 to seamlessly provide a designated touchpad area in the C-cover 435 coversheet 405. Any combination of continuous coversheet for haptic keys and vias in the coversheet for placement of haptic keys of a keyboard coversheet layer 405 are contemplated in various embodiments. Further, it is contemplated that in some embodiments one or the other of a haptic keyboard or haptic touchpad may be used with a keyboard 400 having mechanically actuated keys 401 or a touchpad 402 with a mechanically actuated diving board mechanism. Any combination of the above coversheet 405 layouts described is contemplated in embodiments described herein.

The keyboard stack up 400 may further include a C-cover substructure 435 forming part of the base chassis with a cutout for keyboard 401 and touchpad 402. The C-cover substructure 435 may be made of a rigid material that prevents little or no movement. The rigidity of the C-cover substructure 435 allows the other layers within the keyboard 401 to be maintained within the information handling system. In an embodiment, the C-cover substructure 435 may be made of a metal.

The keyboard stack up 400, in an embodiment, may further include any number of adhesive layers 415. In an embodiment, a first adhesive layer 415 may mechanically couple the coversheet layer 405 to a contact foil layer 410. The first adhesive layer 415 may include the placement of the adhesive at locations that may enhance the movement and prevent the hindrance of the actuation of the coversheet layer 405 at those locations across the coversheet layer 405 where keys are present. In a specific embodiment, the first adhesive layer 415 may include placing the adhesive along borders of each of the keys as well as placing the adhesive at a central location of each of the keys.

The contact foil layer 410 may be adhered to the coversheet layer 405 via the first adhesive layer 415 and may be made of any elastically resilient material that, when any given key is actuated or the contact foil layer 410 is bent towards a lower portion of the respective key, returns to its original state when the respective key is no longer being actuated. The contact foil layer 410 may include a number of metal traces 445 formed on at least one surface of the contact foil layer 410 that electrically and communicatively couples each of the keys and a corresponding piezoelectric element 420 to a keyboard controller 425 of an information handling system that includes a haptic feedback keyboard control system such as described in connection with FIG. 1. In an embodiment, the keyboard controller 425 may be a dedicated controller communicatively coupled to the contact foil layer 410 so as to detect electrical charges (e.g., a piezo actuation signals) from each of the piezoelectric elements 420 and provide haptic feedback control signals (e.g., haptic movement feedback control signals and haptic sound feedback control signals) back to the respective piezoelectric elements 420. In an alternative embodiment, the keyboard controller 425 may operate in connection with a processor of the information handling system that, among other computations and execution of other computer readable program code, also executes computer readable program code associated with the haptic feedback keyboard control system as described in FIG. 1.

During operation of each key on the keyboard 401, the contact foil layer 410 may receive an electrical charge (e.g., a piezo actuation signal) from the respective piezoelectric elements 420 as they are compressed upon actuation at the metal traces 445 that conduct the electrical charge (e.g., a piezo actuation signal) to the controller 425 associated with the keyboard 400. The metal traces 445 formed on the contact foil layer 410 may further be used to conduct a haptic feedback control signal from the controller 425 to the piezoelectric elements 420. Varying polarities, voltages, or currents of the haptic feedback control signal may cause the piezoelectric elements 420 to stretch or contract in response. For example, as described herein, the controller 425 may apply an oscillating voltage haptic feedback control signal that causes one or of the piezoelectric elements 420 to move between its upward warped and downward warped positions to generate an audible sound. The magnitude and frequency of oscillation of the voltage supplied in the form of the haptic feedback control signal by the controller 425 in an embodiment may be set according to sound volume levels provided via a graphical user interface (e.g., user-specified sound volume level), via setting of an operating software application, or provided by a predictive machine learning module customizing user personal typing profiles. For example, the keyboard controller 425 may access a haptic sound volume look-up table in order to determine characteristics of a haptic feedback control signal voltage (e.g., magnitude, polarity, frequency) to be applied to any given piezoelectric element to meet preset, user-specified, or otherwise sound volume levels appropriate for an operating application. In such a way, a user selection settings or a particular application's requirement may control the volume of sound generated at a key 401 in response to the user pressing the key 401.

This haptic feedback control signal transmitted to of each of the actuated piezoelectric elements 420 may also cause a haptic movement feedback presented at each of the keys that the user may feel. This haptic movement feedback may be relayed to the user within microseconds of the user actuating any of the keys on the keyboard 401 such that the user physically detects a sensation that the key was pressed. This sensation felt by the user may be present despite no actual mechanical devices such as a scissor mechanism or other types of keyboard mechanical devices being present among the layers of the keyboard 401. This concurrent haptic movement feedback and haptic sound feedback may be selected by users of haptic keyboards. In an embodiment, the keyboard controller 425 may access a haptic movement look-up table in order to determine characteristics of a haptic feedback control signal voltage (e.g., magnitude, polarity, frequency) to be applied to any given piezoelectric element to meet preset, user-specified, or otherwise required haptic movement intensity levels (e.g., intensity of force caused by upward or downward warping of piezoelectric elements 420).

The keyboard stack up 400 may further include a second adhesive layer 416 that mechanically couples the contact foil layer 410 to a support plate 430. In an embodiment, the second adhesive layer 416 may include the placement of an adhesive along borders of each piezoelectric element 420 of the keyboard stack up 400. As shown in FIG. 4, the second adhesive layer 416 includes circular voids that conform to a shape of each piezoelectric element 420 within the keyboard stack up 400.

The support plate 430 may be made of rigid material such as a metal. The support plate 430 prevents deformation of the keyboard stack up 400 except for, in some embodiments, the contact foil layer 410, piezoelectric element 420, first adhesive layer 415, and second adhesive layer 416 as for operation of the haptic keys. As such, the contact foil layer 410 may be allowed to detect the deformation of the piezoelectric elements 420. Additionally, a user using the keyboard 401 may feel a level of rigidity in the keyboard 401 except that at the locations of the keys where the user has expected that some level of deformation occurs when pressure is applied to provide for key actuation of the piezoelectric element 420.

In an embodiment, the support plate 430 may include a number of cavities 431 formed therein. The cavities 431 may be sized to have a relatively smaller diameter than the diameter of each of the respective piezoelectric elements 420. By including these cavities 431, the piezoelectric elements 420 may be allowed to deform into the cavities 431 so that the deformation of the piezoelectric element 420 creates the electrical charge (e.g., a piezo actuation signal) described herein. The metal plate of the piezoelectric elements 420 may have a diameter greater than cavities 431. Upon compression or contraction of the piezoelectric material portions, such as a ceramic disk of the piezoelectric element 420, the metal plate may warp downward into the cavity 431. The depth of the cavities 431 may also be selected to allow for at least a central portion of each piezoelectric element 420 to be deflected into the cavities 431 some distance. This distance of deflection, in an embodiment, may be 0.1 mm or smaller or may be greater. In an embodiment, the cavities 431 may also be holes punched or machined through the support plate 430.

In an embodiment, the support plate 430 may be secured to other rigid elements of the information handling system. In an embodiment, the support plate 430 may be secured to the C-cover substrate 435 via a number of bolts, screws, or other mechanical or chemical coupling device as shown in an embodiment. In some embodiments, the support plate 430 may be operatively coupled to the D-cover of the information handling system.

Figure 5:
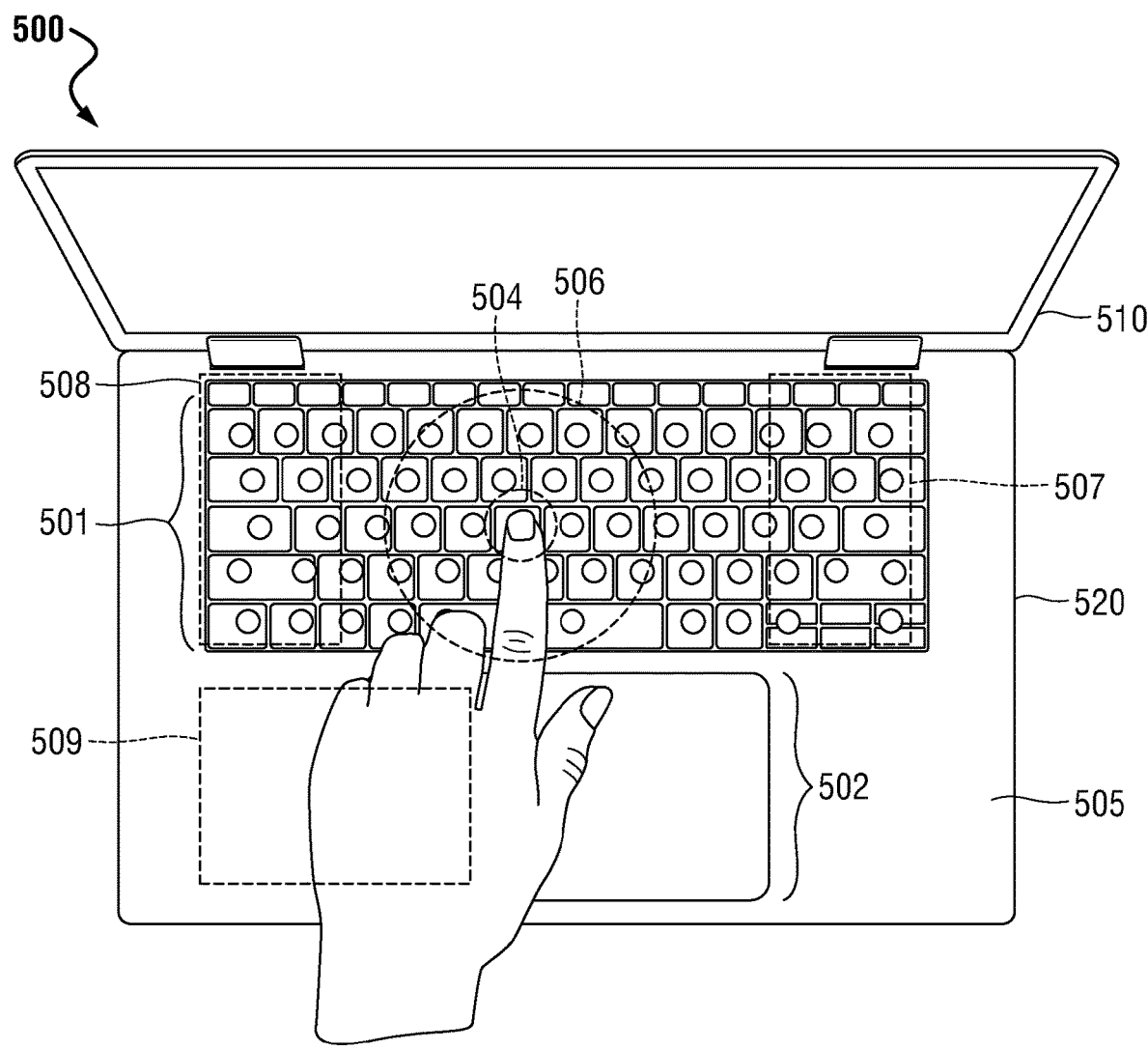
FIG. 5 is a graphical diagram illustrating piezoelectric elements capable of generating sound within specific regions of the keyboard according to an embodiment of the present disclosure.

FIG. 5 is a graphical diagram illustrating piezoelectric elements of a haptic keyboard capable of generating sound within specific regions of the keyboard pursuant to downward force applied by a user on a key or touchpad, or as instructed by software applications running on the information handling system according to an embodiment of the present disclosure. FIG. 5 shows an information handling system 500 implementing a haptic keyboard area 501 and a haptic touchpad area 502 of a coversheet for a base chassis 520 of the information handling system according to embodiments herein. Information handling system 500 includes the base chassis 520 which may house the haptic keyboard 501 and the haptic touchpad 502 including the stack up layers of each as described in embodiments herein. Further, the C-cover of the base chassis 520 may include the coversheet 505 that operates to provide user interface locations for keys of haptic keyboard 501 and for a touchpad interface area for haptic touchpad 502. The base chassis 520 may further house components of the information handling system including processor, graphics processor, motherboard, graphics board, bus systems, power and battery systems, wireless systems, thermal controls, data and power ports, and other components in accordance with the description of FIG. 1. Those components may be installed according to techniques understood by those of skill. Further, base chassis 520 may be hinged to a display chassis 510 for housing a display device and other components according to embodiments herein.

As described herein, a separate piezo element may be situated directly beneath each key cap within the cover sheet in some embodiments. In other embodiments, a plurality of piezo elements may be distributed horizontally across a layer disposed beneath the cover sheet, but the placement of each of the plurality of piezo elements may not directly correspond to the location of individual keys within the cover sheet. For example, in some embodiments, a single piezo element may be situated directly beneath a point 504 on the cover sheet at which the user applies a downward force. In one such embodiment, only a single piezo element situated directly beneath the point 504 may deform, causing the controller to register a keystroke. In another such embodiment, the downward force applied at point 504 may also cause some deflection of piezo elements situated within the region 506, situated nearby the point 504, but not directly beneath it.

In other embodiments, the point 504 on the cover sheet at which the user applies downward force may not be situated directly above a single piezo element. In such an embodiment, the downward force applied at point 504 may cause full or partial deflection of one or more of the nearby piezo elements within the region 506. Determination of the degree to which each of the piezo elements within region 506 deflect in such embodiments may be used to triangulate the center of the downward force applied at point 504. Because some of these piezo elements may be situated beneath the base chassis top cover, where a user may rest her palms while typing, the degree to which each of these piezo elements deflect may indicate placement of a user's palms upon the base chassis top cover at a given point in time in some embodiments.

As described herein, a single piezo element may be situated directly beneath a single key 504 on the cover sheet at which the user applies a downward force. In one such embodiment, only a single piezo element (not shown) situated directly beneath the point 504 may deform, causing the controller to register a keystroke. In such an embodiment, the controller may respond with a haptic feedback control signal that causes the single piezo element situated beneath key 504 to generate haptic movement feedback or haptic sound feedback the user can feel or hear. The controller in such an embodiment may perform a similar response each time a separate key of the keyboard is pressed while the user types. Thus, in such an embodiment, the user may perceive a separate haptic sound feedback and haptic movement feedback at each key, as the user presses those keys individually.

In one embodiment, it may be a design selection to use one piezoelectric element for a tactile haptic feedback event such as for an actuated key while one or more other piezoelectric elements may be used for sound generation for haptic sound feedback or other audio signaling purposes. In some embodiments, a user adjusted setting or a predictive machine learning algorithm adjusting user setting for a personal typing profile may cause election of separate tactile movement and sound haptic feedback control signals to different piezoelectric elements. In some embodiments, an operating application may be designed to work with the haptic piezoelectric elements and optionally other speakers, to coordinate separate tactile movement and sound haptic feedback control signals to different piezoelectric elements. In some other embodiments, a piezoelectric element may have a movement intensity level or sound volume level (e.g., as set by the user, an operating software application, or by a predictive machine learning algorithm adjusting user setting for a personal typing profile) or other factors of the tactile haptic feedback signal and haptic sound feedback signal that cannot be simultaneously combined into a single haptic feedback control signal to a single piezoelectric element. In one example, a user may choose a movement intensity level for the piezoelectric element situated beneath the point 504 that is associated with a haptic movement feedback control signal that conflicts with a haptic sound feedback control signal of a chosen sound tone or sound volume. The single piezoelectric element situated beneath point 504 may not be capable of simultaneously providing haptic movement feedback at the desired movement intensity level and using that movement to generate haptic sound feedback in accordance with the defined sound volume level or tone for example. For example, the user may choose a relatively low movement intensity level associated with a voltage having a magnitude of 5V. The same user may choose a relatively high sound volume level associated with a voltage of at least 20V. This may require the controller to apply a haptic feedback control signal voltage having a magnitude of at least 20V to the piezoelectric element situated beneath point 504 to achieve the defined sound volume level, even if the controller is switching the polarity of the 20V at the resonant frequency of the material of which the ceramic disc, metallic ring, or other components of the piezoelectric element situated beneath point 504 are comprised. In such a scenario, it may not be possible for the controller to send a single haptic feedback control signal to the piezoelectric element situated beneath point 504 that can cause the piezoelectric element to generate both a haptic movement feedback meeting the defined movement intensity level and a haptic sound feedback meeting the defined sound volume level.

In such embodiment where separate piezoelectric elements are to be used for tactile movement haptic feedback and haptic sound feedback, the controller may transmit a haptic movement feedback control signal to the piezoelectric element situated beneath point 504 via the same metal traces through which the controller received the piezo actuation signal to cause haptic movement feedback at point 504. The haptic movement feedback control signal in such an embodiment may apply a voltage having a magnitude sufficient to cause the ceramic disc of the piezoelectric element situated beneath point 504 to warp upward or downward so as to cause haptic movement feedback in accordance with the desired movement intensity level. The controller in such an embodiment may also transmit a haptic sound feedback control signal to one or more piezoelectric elements situated nearby the piezoelectric element beneath point 504 to cause haptic sound feedback nearby point 504. For example, the controller may transmit a haptic sound feedback control signal to one or more piezoelectric elements situated within the region 506, surrounding the point 504 from which the controller received the piezo actuation signal. The haptic sound feedback control signal in such an embodiment may have a voltage magnitude and frequency capable of generating haptic sound feedback in accordance with the defined sound volume level. In such a way, the controller in embodiments described herein may simultaneously provide haptic movement feedback and haptic sound feedback through a plurality of piezoelectric elements, even when a single piezoelectric element is not used for both the haptic movement feedback as well as the haptic sound feedback.

In other embodiments, groups or regions of keys of the keyboard or the touchpad may generate haptic sound feedback, as instructed by the controller, either in response to the user typing or otherwise interacting with the keyboard/touchpad, or in response to an application running on the information handling system. As described herein, a haptic actuation indicator signal in an embodiment may be a piezo actuation signal received at the controller or processor, indicating a key situated above the piezoelectric element has been actuated by a user, or may comprise a notification or code instructions received at the processor or controller from a software application currently operating on the information handling system. For example, some applications may include alarms or notifications that may be set to make an audible sound via the haptic keyboard, rather than through the main speaker system of the information handling system. As another example, some applications may cause the haptic keyboard, in lieu of or in combination with the main speakers of the information handling system to emit sound in accordance with an audio signal having one or more channels for one or more speakers. Such notifications or audio signals in an embodiment may comprise a haptic actuation indicator signal.

In another aspect of an embodiment, the controller may cause piezoelectric elements situated beneath the palm rest 509 of the C-cover, outside the keyboard 501 to provide such haptic sound feedback or may provide haptic feedback with piezoelectric elements not currently being actuated within the keyboard 501 during typing if the user is also typing. For example, in an embodiment in which the controller detects the user currently typing, or detects an actuation of a key or the touchpad within a preset period of time, the controller may transmit a haptic sound feedback control signal to a piezoelectric element situated within region 509, beneath the palm rest of the C-cover or elsewhere within haptic keyboard 501 at locations not currently being actuated. One or more piezoelectric elements within region 509 or elsewhere within haptic keyboard 501 at locations not currently being actuated may then produce the haptic sound feedback associated with receipt of the notification from the currently running application. In such a way, the controller may use piezoelectric elements situated outside the keyboard or elsewhere within haptic keyboard 501 at locations not currently being actuated to produce an audible notification, without altering the haptic movement feedback and haptic sound feedback from the piezoelectric elements situated beneath the actuated keys of the keyboard 501 where the user experiences tactile movement haptic feedback while typing.

In some embodiments, notifications or alerts from one or more applications currently running on the information handling system may be set to be played through one or more of the piezoelectric elements of the haptic keyboard, either in tandem with, or in place of the information handling system speaker system. This may be useful to a user, for example, if the user is listening to a separate audio stream through the speakers and does not wish to hear the notifications or alerts through those speakers. For example, if the user is watching a movie, listening to music, or is engaged in an audio conference via the main speaker system, it may be preferable to set background applications to deliver notifications through the haptic keyboard, rather than overlaying or interrupting the audio currently playing through the speaker system. In such an embodiment, the keyboard controller may set one or more piezoelectric elements of the keyboard, or groups of the piezoelectric elements to generate an audible sound. For example, in one embodiment in which the user is not currently typing, the keyboard controller may set all of the piezoelectric elements of the keyboard to generate an audible sound (e.g., buzzing or a tone) when a background application generates a notification or alarm.

In other embodiments, the keyboard controller may cause groupings of the piezoelectric elements to generate sound. For example, the keyboard controller in an embodiment may cause all piezoelectric elements within the region 507, to the right of the keyboard to generate audible sound at one instance in time, then cause the piezoelectric elements within the region 508, to the left of the keyboard to generate audible sound at a later point in time. This may be used, for example, to enhance surround sound effects. In such an embodiment, a speaker system may include an audio controller that controls the level of audio played in each speaker of the information handling system based on the placement of the speaker with respect to the user, and upon an embedded multi-channel audio signal within the streaming video indicating the directionality of the audio accompanying the video signal. For example, the embedded audio signal may instruct a sound of an explosion shown on the right side of the screen to be played predominantly through speakers situated to the right side of the viewer. Such an audio signal may include multiple channels, with each channel mapped to one or more speakers of the information handling system. For example, in a traditional 5.1 channel surround sound system, an audio signal may include five channels—a center channel, a front right channel, a front left channel, a rear right channel, and a rear left channel. The center channel may be mapped to a speaker situated in the center of the viewing area (e.g., twelve o'clock from the viewer's perspective), the right front channel at roughly two o'clock, the right rear channel at roughly four o'clock, and so forth in a clockwise manner. In embodiments of the present disclosure, one or more piezoelectric elements or groups of piezoelectric elements within the haptic keyboard may be mapped to one of these channels. For example, the piezoelectric elements situated within the region 507 in an embodiment may be mapped to the right rear channel of a 5.1 surround sound audio signal, while the piezoelectric elements situated within the region 508 may be mapped to the left rear channel. As another example, the piezoelectric elements situated within the region 507 in an embodiment may be mapped to the right front channel of a 5.1 surround sound audio signal, while the piezoelectric elements situated within the region 508 may be mapped to the left front channel. In still other examples, the piezoelectric elements situated within the region 507 in an embodiment may be mapped to a limited subset of the frequency range for sounds played within either the right front channel or the right rear channel.

If a user is streaming video that supports such surround sound effects on the information handling system, the keyboard controller may instruct the piezoelectric elements situated within specific region correlating to that region's mapped channel according to the received audio signal. For example, if the embedded signal instructs the information handling system to play audio predominantly through speakers situated to the right side of the viewer in an embodiment, the keyboard controller may transmit a haptic feedback control signal to cause the group of piezoelectric elements within region 507, to the right of the screen, to generate a haptic sound feedback in tandem with the sound played through the speakers on the right side of the information handling system. In such a way, the piezoelectric elements in embodiments of the present disclosure may generate audible sound to enhance user experience while typing, and to enhance user experience of other audible sounds traditionally generated through the speakers of the information handling system.

FIG. 6 is a graphical diagram illustrating a personal typing profile graphical user interface allowing a user to personalize several factors dictating haptic response of a piezo haptic keyboard assembly according to an embodiment of the present disclosure. As described herein, the tactile sensation and sound of traditional mechanical keyboards is dictated mainly by the structural dynamics of the key cap, scissor mechanism, and rubber dome within the traditional keyboard assembly. In other words, these structures and the way in which they move when a user applies downward pressure dictate the user's tactile and audible experience. By applying a haptic feedback control signal with varying magnitudes, polarities, and frequencies of voltage to one or more of the piezo elements in a piezo haptic keyboard assembly, a controller may control each of these factors influencing a user's tactile and audible experience. In contrast to conventional keyboard assemblies, each of these factors may be adjusted, allowing for a wide range of tactile and audible experiences for users. The personal typing profile user interface 502 in an embodiment may allow a user to set each of these factors according to their personal preferences. A controller operably connected to each of the piezo elements within a piezo haptic keyboard may receive instructions based on adjustable piezo element settings, and apply those settings to control the ways in which each of the piezo elements deflects in embodiments described herein.

Each of the factors dictating a user's tactile and audible haptic experience may be preset to a default position designed to mimic a conventional keyboard in an example embodiment, and adjusted by a user via the personal typing profile user interface 602 in an embodiment. In other embodiments, one or more sets of default settings of the haptic feedback factors may be set or required by particular applications operating on the information handling system. In yet other embodiments, a personal typing profile may adjust such settings based on time or day or based on detected physical surroundings factor such as location, ambient audio noises, ambient light conditions or similar inputs. The personal typing profile user interface 602 in an embodiment may include a plurality of inputs or controls for adjusting, manipulating, and configuring one or more of these factors dictating a user's tactile and audible haptic experience. This can include receiving user commands from a mouse, keyboard, speech input, web site, remote web service, and/or other device such as a camera or video input to affect or modify operations of the personal typing profile user interface 602. For example, the personal typing profile user interface 602 in an embodiment may include a plurality of configurable icons, buttons, sliders, input boxes, selection options, menus, tabs and so forth having multiple configurable positions, shapes, text, data, and sounds to facilitate operations of the controller operably connected to the plurality of piezo elements of the piezo haptic keyboard assembly.

The factors dictating a user's tactile and audible haptic experience which may be manipulated via the user interface 602 in an embodiment may include, for example, the force threshold 610 required for the controller to register that a keystroke has occurred in some embodiments, and the size of the area 620 in which the user must apply such a force in order for the controller to register a keystroke due to required force of the piezo element to application of force. In an example embodiment, the personal typing profile user interface 602 may allow the user to move the position of an indicator 614 along a slider to indicate a user-selected force threshold 610 for required force (between a minimum and maximum allowable value) at which the controller may detect that a keystroke has occurred. Upon receipt of such a change in required force, the typing profile personalization system in an embodiment may adjust a threshold voltage value, or a threshold change in voltage value that must be detected at one or more piezo elements in order to register a keystroke. In another example of such an embodiment, the personal typing profile user interface 602 may allow the user to move the position of an indicator 624 along a slider to indicate a user-selected detection area 620 surrounding the piezo element (between a minimum and maximum required force allowable value) in which a user may apply downward pressure to cause the controller to detect that a keystroke has occurred.

Other factors dictating a user's tactile haptic experience that may be manipulated via the user interface 602 in an embodiment may include the intensity 630, duration 640, and sharpness 650 at which a piezoelectric element vibrates or otherwise moves in response to a haptic feedback control signal following registering of a keystroke, and the burst count 660 and interval 670 of sustained vibrations or other such movement occurring in response to use of specific applications. In some embodiments, in response to receiving a haptic actuation indicator signal (e.g., a piezo actuation signal), for example, indicating a piezoelectric element has been pressed downward by the user, the controller may apply a haptic feedback control signal to the same piezoelectric element, causing it to move between its upward warped and downward warped positions over a preset time period. For example, this haptic feedback control signal may have a certain voltage (magnitude or amplitude), frequency, current, or polarity (−,+) sufficient to render the piezoelectric material of the piezoelectric element to cause a haptic movement. Such a haptic feedback control signal in an embodiment may be a sine wave, a square wave, a pulsed signal, or other waveform of changing current, voltage, or polarity applied to the piezoelectric element.

The personal typing profile user interface 602 may allow the user to set one or more of these factors controlling the characteristics of such haptic responses. For example, the user in an embodiment may move the position of an indicator 634 along a slider to indicate a user-selected vibration intensity 630 (between a minimum and maximum allowable value) or force at which a piezoelectric element moves between its upward and downward warped positions during haptic response following a keystroke. As another example, the user in such an embodiment may move the position of an indicator 644 along a slider to indicate a user-selected vibration time duration 640. In still another example, the user in an embodiment may move the position of an indicator 654 along a slider to indicate a user-selected vibration sharpness 650 setting the duration of time between detection of the keystroke and deflection of the piezo element to its upward or downward warped positions.

The controller in some embodiments may also cause a piezoelectric element to vibrate for a prolonged period, or in a burst under certain conditions. Still other factors dictating a user's haptic experience that may be manipulated via the user interface 602 in an embodiment may include the burst count 660 and interval 670 of sustained vibrations or haptic response movements occurring in response to use of specific applications. The personal typing profile user interface 602 may allow the user to set one or more of these factors controlling the characteristics of such vibration bursts. For example, the user in an embodiment may move the position of an indicator 664 along a slider to indicate a user-selected burst count 660 or number of vibrations or other haptic response movements occurring during each such burst. As another example, the user in an embodiment may move the position of an indicator 674 along a slider to indicate a user-selected burst interval 670 or duration of such vibration bursts. The controller in such an embodiment may apply the user-selected burst count 660 and burst interval 670 by setting the number of voltage pulses, and the timing between them that the contact foil applies to the piezo element. In such a way, the user may set the haptic dynamics for a piezo haptic keyboard to her personal preferences using the personal typing profile user interface 602.

The controller in some embodiments may also cause a piezo element to vibrate or move to generate a sound under certain conditions. Such a factor dictating a user's haptic experience may be manipulated via the user interface 602 in an embodiment and may include the user-specified sound volume level 680 for sound occurring in response to use of specific applications when registering keystrokes. The personal typing profile user interface 602 may allow the user to set or specify one or more sound volume levels 680 controlling the characteristics of such auditory output in response to a keystroke. For example, the user in an embodiment may move the position of an indicator 684 along a slider to indicate a user-specified sound volume level 680 for how loud an auditory response may be. For example, a minimum setting may represent a silent mode for typing on the haptic keyboard. Further a specified volume or silent mode may be determined from an application setting, time of day, or detected physical surroundings factors of an information handling system. A silent mode or quiet mode may be implemented for example when ambient noise is detected via a microphone indicating a user is in a meeting or conducting a conference call or video chat in one embodiment. In another embodiment, a silent mode or quiet mode may be utilized in low ambient light conditions detected by a light detector or in evening hours or at a home location. In yet other embodiments, a higher volume or more robust tactile haptic feedback settings may apply depending on the application operating such as with a gaming application. As another example, the user in an embodiment may move the position of an indicator 684 along a slider to indicate a sound volume level 680 provided in response to keystrokes during typing on the haptic keyboard. The controller in such an embodiment may apply the user-specified sound volume level 680 by applying voltage of a magnitude and frequency associated with the user-specified sound volume level 680 in a volume look-up table in an embodiment to one or more piezoelectric elements. For example, this haptic feedback control signal may have a certain voltage (magnitude or amplitude), frequency, current, or polarity (−,+) sufficient to cause the piezoelectric element to vibrate, disturbing nearby air, and create an audible sound. Such a haptic feedback control signal may be a sine wave, a square wave, a pulsed signal, or other waveform of changing current, voltage, or polarity applied to the piezoelectric element. In such a way, the user may set the haptic sound feedback for a piezo haptic keyboard to her personal preferences using the personal typing profile user interface 602.

Figure 7:
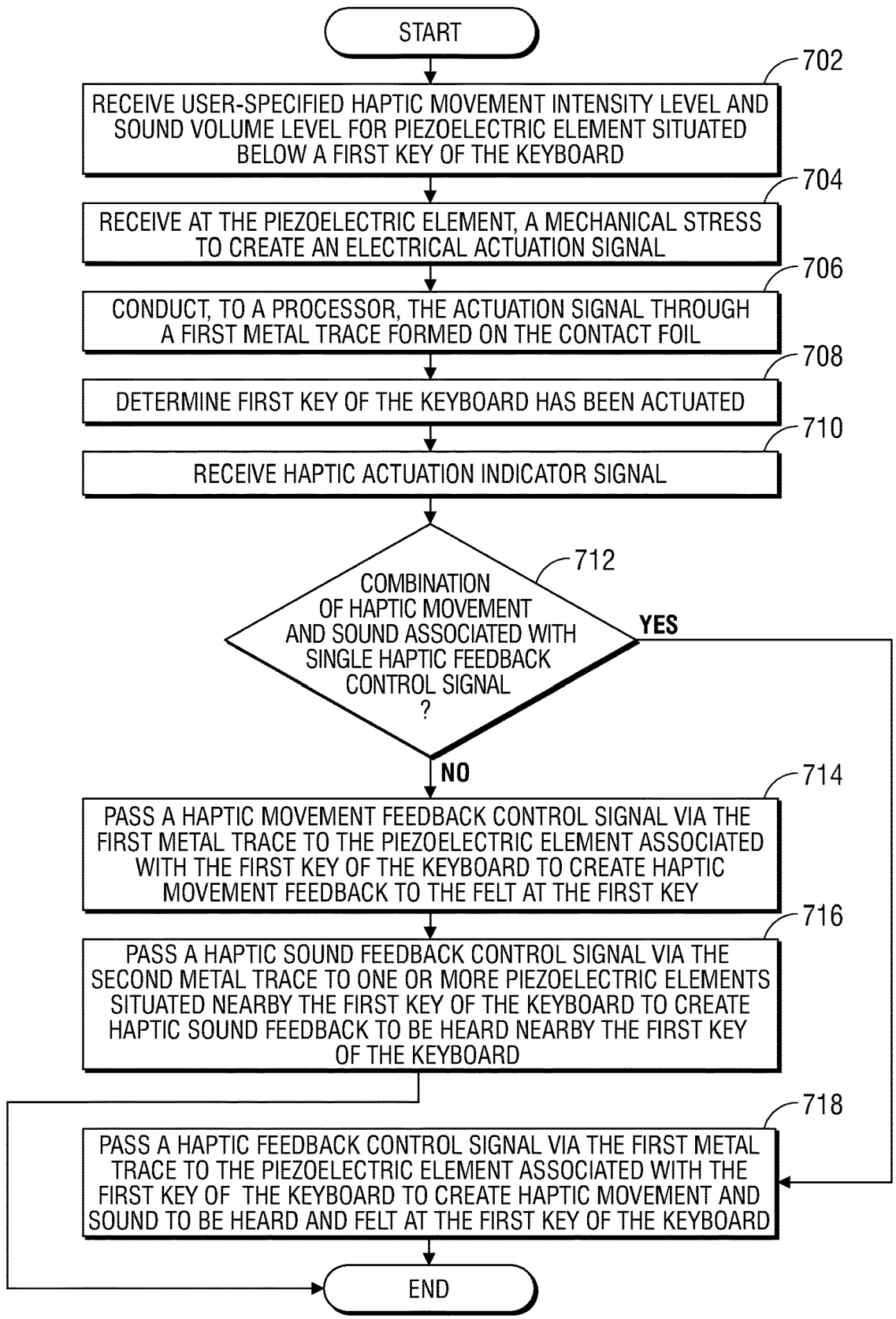
FIG. 7 is a flow diagram illustrating a method of generating a haptic sound feedback and a haptic movement feedback at separate piezoelectric elements according to an embodiment of the present disclosure.

FIG. 7 is a flow diagram illustrating a method of generating a haptic sound feedback and a haptic movement feedback at separate piezoelectric elements, in response to receiving a haptic actuation indicator signal according to an embodiment of the present disclosure. As described herein, in some embodiments, the controller may transmit a haptic movement feedback control signal to a first piezoelectric element to cause haptic movement feedback (tactile sensations felt by the user's finger) at a first location on the haptic keyboard, touchpad, or palm rest, and transmit a separate haptic sound feedback control signal to a second piezoelectric element. The haptic sound feedback control signal in such an example embodiment may cause haptic sound feedback (e.g., click, buzz) at a second location on the haptic keyboard, touchpad, or palm rest. In such a way, the controller may cause two separate piezoelectric elements to provide haptic movement feedback and haptic sound feedback in tandem, and in response to a single received haptic actuation indicator signal (e.g., a piezo actuation signal).

At block 702, the controller in an embodiment may receive a haptic movement intensity level and a haptic sound volume level for a piezoelectric element situated below a first key of the keyboard. For example, in an embodiment described with reference to FIG. 6, the intensity 630, duration 640, and sharpness 650 at which a piezoelectric element vibrates or otherwise moves in response to a haptic control feedback signal following registering of a keystroke may be manipulated via the user interface 602 or may be set by currently operating applications. User specified or otherwise specified settings may apply to all keys of a piezo haptic keyboard or a subset of keys of the haptic keyboard according to embodiments of the present disclosure. The user in such an embodiment may move the position of an indicator 634 along a slider to indicate a user-selected vibration intensity level 630 (between a minimum and maximum allowable value) or force at which a piezoelectric element moves between its upward and downward warped positions during haptic response following a keystroke. The sound volume level 680 for sound occurring in response to use of specific applications when registering keystrokes may also be manipulated via the user interface 602 in an embodiment. For example, the user in an embodiment may move the position of an indicator 684 along a slider to indicate a user-selected sound volume level 680 for how loud an auditory response may be. A minimum sound volume level in such an embodiment may represent a silent mode for typing on the haptic keyboard. As another example, the user in an embodiment may move the position of an indicator 684 along a slider to indicate a sound volume level 680 provided in response to keystrokes during typing on the haptic keyboard. An operating application may be designed or detected surroundings conditions for the information handling system may provide for default factor settings for the haptic tactile movement or haptic sound feedback provided via the piezoelectric elements of embodiments herein.

In some embodiments, sound volume level and movement intensity level received at block 702 may be set through a machine learning process in which a typing profile machine learning module may determine optimal haptic keyboard settings (e.g., movement intensity level and sound volume level) based on one or more indicators of current operating conditions, user behavior or mood, or conditions of the surrounding environment. Although embodiments described herein may refer to user-specified movement intensity level and user-specified sound volume level, such as the known values received via the graphical user interface, other embodiments contemplate a processor or controller causing one or more piezoelectric elements to generate haptic movement feedback or haptic sound feedback meeting movement intensity levels and sound volume levels determined by the machine learning neural network to be optimal for a given set of conditions.

The piezoelectric element situated below the first key of the keyboard may receive a mechanical stress in an embodiment to create a haptic actuation indicator signal (e.g., a piezo actuation signal) in the form of an electrical charge at block 704. For example, in an embodiment described with reference to FIG. 2, a piezoelectric element 220 may be situated beneath a key pedestal 206, and housed over a cavity 231 formed in the support plate 230. A mechanical stress applied to the key pedestal 206, and thus, to the piezoelectric element 220 may cause deformation of the ceramic disc 222 and the metal plate or ring 225 comprising the piezoelectric element 220 into the cavity. As the piezoelectric disk material 222 is compressed by deflection and the metal plate or ring 225 warped downward, a change in voltage may be detected. The electrical charge created when the user actuates the key 200 with the user's finger and the piezoelectric element 220 is subjected to a mechanical stress may be detected between soldering points 235 and 240. This electrical charge in an embodiment may be referred to herein as a piezo actuation signal. The piezo actuation signal may further comprise one of a plurality of types of haptic actuation indicator signals, which indicate to the controller that haptic feedback (e.g., haptic sound feedback or haptic movement feedback) is appropriate such as from particular applications or including a customized set of tactile and audio haptic feedback events during operation. The electrical charge (e.g., a piezo actuation signal) is communicated down metal traces formed on the contact foil 210 to a keyboard controller (not shown).

At block 706, a contact foil may conduct the piezo actuation signal to a processor through a first metal trace formed on its surface in an embodiment. For example, in an embodiment described with reference to FIG. 2, the piezoelectric element 220 may be electrically and communicatively coupled at a first portion 222 to a metallic trace formed on a surface of a contact foil 210 by a first soldering point 235 and at a second portion 225 to a metallic trace in contact foil 210 via a second soldering point 240. The first soldering point 235 and second soldering point 240 may be formed to receive the electrical charge (e.g., a piezo actuation signal) upon deflection of the piezoelectric element 220 as a user actuates the key 200. The contact foil 210 may include a number of metal traces formed on its surface that electrically and communicatively couple each of the corresponding piezoelectric elements 220 of key 200 to a controller such as a processor of an information handling system that includes a haptic feedback keyboard control system such as described herein. During operation of the key 200, the contact foil 210 may transmit the piezo actuation signal from the piezoelectric element 220 via the metal traces that conduct the electrical charge to the keyboard controller or other processor associated with the key 200.

The controller or processor may determine that a first key of the keyboard has been actuated at block 708, in an embodiment. This determination may be made based on the piezo actuation signal that the controller or processor receives from one or more specific metal traces formed on the surface of the contact foil. For example, in an embodiment described with reference to FIG. 2, during operation of the key 200, the contact foil 210 may transmit the piezo actuation signal from the piezoelectric element 220 via the metal traces that conduct the electrical charge to the keyboard controller or other processor associated with the key 200. The piezo actuation signal (electrical charge) created when the user actuates the key 200 and the piezoelectric element 220 is subjected to a mechanical stress may be detected between soldering points 235 and 240, and communicated down metal traces formed on the contact foil 210 to a controller (not shown). Alternative embodiments may be used to allow the controller or processor to determine which key on the keyboard generated the electrical charge (e.g., a piezo actuation signal). In some embodiments, where the controller or processor receives a haptic actuation indicator signal form an operating application, blocks 704, 706, and 708, may be skipped since the application may control the levels of factors for the tactile movement haptic feedback or haptic sound feedback.

The controller or processor in an embodiment may receive a haptic actuation indicator signal other than a piezo actuation signal at block 710. As described herein, a haptic actuation indicator signal in an embodiment may be a piezo actuation signal received at the controller or processor, indicating a key or touchpad situated above the piezoelectric element has been actuated by a user. In other embodiments, a haptic actuation indicator signal may comprise a notification or code instructions received at the processor or controller from a software application currently operating on the information handling system. For example, some applications may include alarms or notifications that may be set to make an audible sound via the haptic keyboard, rather than through the main speaker system of the information handling system. As another example, some applications may cause the haptic keyboard, in lieu of or in combination with the main speakers of the information handling system to emit sound in accordance with an audio signal having one or more channels for one or more speakers. Such notifications or audio signals in an embodiment may comprise a haptic actuation indicator signal that is not a piezo actuation signal. In yet other embodiments, a notification or code instruction from an application may also be received to generate a tactile movement haptic feedback event. If the processor or controller has received any haptic actuation indicator signal, including a piezo actuation signal, the method may proceed to block 712.

At block 712, the processor or the controller may determine whether the combination of the haptic movement intensity setting and haptic sound volume setting are associated with a single combination of voltage frequency and amplitude within one or more look-up tables. For example, in an embodiment described with reference to FIG. 3B, the controller may determine the polarity, frequency, and magnitude of voltage to be applied within a haptic feedback control signal in order to meet the movement intensity level and sound volume level received at block 702 by accessing a haptic sound look-up table and a haptic movement look-up table. A haptic movement look-up table in an embodiment may provide a combined haptic feedback control signal with a range to accommodate the received movement intensity level and a resonant frequency of the piezoelectric element to meet the settings for haptic sound feedback such as sound volume level. Thus, such a look-up table may also provide one or more additional voltage magnitudes that may be applied at non-resonant frequencies to also meet the received sound volume level. In some embodiments, the sound volume level received at block 702 may be associated with a range of combinations of voltage amplitudes and frequencies. The combined haptic feedback control signal to a single piezoelectric element versus separate haptic feedback control signals to different piezoelectric elements for tactile and sound haptic feedback may be a design choice in some embodiments. In some other embodiments, a combined haptic feedback control signal to a single piezoelectric element may not work effectively for both tactile movement and sound haptic feedback, and distinct piezoelectric elements must be used.

The sound volume created by the piezoelectric element 320 in an embodiment may depend, at least partially, on the amplitude at which the voltage applied to the soldering points 335 and 340 is oscillated (e.g., the magnitude of the voltage supplied at the soldering points 335 and 340). For example, a higher voltage amplitude or magnitude applied at soldering points 335 and 340 may result in a higher sound pressure, and thus, a higher audible volume of sound. Additionally, changes in frequency of voltage oscillation in an embodiment may effectively change the volume of sound generated, even if the voltage amplitude or magnitude remains constant. As a consequence, the volume of sound generated by movement of the piezoelectric element 320 may be controlled somewhat independently from the haptic movement feedback felt by the user. In other words, two different haptic feedback control signals having identical voltage magnitudes, but two different voltage frequencies may cause a piezoelectric element 320 to generate identical haptic movement feedbacks, but different haptic sound feedbacks. Thus, the user may be able to vary the volume of haptic sound feedback without affecting the intensity of the haptic movement feedback and may vary the haptic movement feedback without varying the volume of haptic sound feedback in an embodiment.

However, in some cases, a piezoelectric element 320 may have a movement intensity level and sound volume level (e.g., as set by the user or by a predictive machine learning algorithm) that cannot be simultaneously achieved in any known single activation of a single piezoelectric element via a haptic feedback control signal. For example, in an embodiment, the haptic movement intensity level received at block 702 may be associated with a first voltage magnitude in a haptic movement look-up table, and the haptic sound volume level received at block 702 may be associated with a second voltage magnitude, or a range of voltage magnitudes in the haptic sound look-up table. If the first voltage magnitude cannot match the second voltage magnitude, or fall within the range of voltage magnitudes associated with the received sound volume level for example, a single piezoelectric element may not be capable of simultaneously providing the desired haptic movement feedback and using that movement to generate the desired haptic sound feedback in accordance with the sound volume level. In other embodiments, applications or a user selection may be made such that a combination haptic feedback control signal for one piezoelectric element may not meet both the tactile movement haptic feedback and the haptic sound feedback intended or desired when using the piezo haptic keyboard. In such circumstances as described above at 712 where no combined haptic feedback control signal is used, the method may proceed block 714. If, however, circumstances as described above provide for use of a combined haptic feedback control signal, the method may proceed block 716.

In an embodiment in which the combination of the haptic tactile movement and haptic sound are not associated with a single combination haptic feedback control signal for a single piezoelectric element at block 714, the controller may pass a haptic movement feedback control signal to the piezoelectric element associated with the first key of the keyboard via a first metal trace, to create haptic movement feedback to be felt at the first key of the keyboard. For example, in an embodiment described with reference to FIG. 5, it may not be possible for the controller to send a single haptic feedback control signal to the piezoelectric element situated beneath point 504 that can cause the piezoelectric element to generate both a haptic movement feedback and a haptic sound feedback. In such an embodiment, the controller may transmit a haptic movement feedback control signal to the piezoelectric element situated beneath point 504 via the same metal traces through which the controller received the piezo actuation signal to cause haptic movement feedback at point 504.

The haptic movement feedback control signal in such an embodiment may apply a voltage having a magnitude sufficient to cause the ceramic disc of the piezoelectric element situated beneath point 504 to warp upward or downward so as to cause haptic movement feedback in accordance with the movement intensity level received at block 702. For example, in an embodiment described with reference to FIG. 3A or FIG. 3B, the controller in an embodiment may send a haptic movement feedback control signal to the piezoelectric element 320 via the metal traces formed on the contact foil 310, through the soldering points 335 and 340 and to a conductive layer of metallic plate or ring 325 formed below the piezoelectric disk material 322 to cause a haptic tactile movement feedback. The conductive layer of metallic plate or ring 325 may apply the haptic movement feedback control signal to the piezoelectric disk material 322 so as to cause the piezoelectric disk material 322 to stretch or shrink depending on the polarity of the haptic feedback control signal applied.

At block 716, the controller in an embodiment may pass a haptic sound feedback control signal to a piezoelectric element situated nearby the first key of the keyboard via a second metal trace, to create a haptic sound feedback to be heard nearby the first key of the keyboard. For example, in an embodiment described with reference to FIG. 5, it may not be designed within an application for or possible for the controller to send a single haptic feedback control signal to the piezoelectric element situated beneath point 504 to cause the piezoelectric element to generate both a haptic movement feedback and a haptic sound feedback in response to a haptic actuation indicator signal received at block 710 for example or in response to a piezo actuation signal received at 704. The controller in such an embodiment may transmit a haptic sound feedback control signal to one or more piezoelectric elements situated nearby the piezoelectric element beneath point 504 to cause haptic sound feedback nearby point 504. For example, the controller may transmit a haptic sound feedback control signal to one or more piezoelectric elements situated within the region 506, surrounding the point 504 from which the controller received the piezo actuation signal.

For example, in an embodiment described with reference to FIGS. 3A and 3B, the conductive layer of metallic plate or ring 325 may apply a changing positive or negative voltage haptic sound feedback control signal to the piezoelectric disk material 322 at soldering point 335 relative to a voltage haptic feedback control signal polarity applied at soldering point 340 to cause the piezoelectric disk 322 to expand or contract depending on the polarity. This may, in turn, cause the metallic layer or disk 325 adhered to the ceramic piezoelectric disk 322 to warp upward or downward in accordance with the applied haptic feedback control signal to the piezoelectric element 320. The controller may oscillate the polarity of the haptic sound feedback control signal, according to the voltage frequency associated with the sound volume level received at block 702 in the haptic sound look-up table. Such a movement at specified frequency of the metallic plate or disc 325 (e.g., from warped downward to warped upward) in an embodiment may generate audible haptic sound feedback at various tones and volume.

The haptic sound feedback control signal in such an embodiment may have a voltage magnitude and frequency capable of generating haptic sound feedback in accordance with the sound volume level received at block 702 or as set by operating applications. The controller may transmit the haptic movement feedback control signal at block 714 and the haptic sound feedback control signal at block 716 simultaneously, to at least two different piezoelectric elements. In such a way, the controller in embodiments described herein may simultaneously provide haptic movement feedback and haptic sound feedback through a plurality of piezoelectric elements, even when a single piezoelectric element is not capable of meeting both the movement intensity level and the sound volume level.

In an embodiment in which the combination of the haptic movement and haptic sound are associated with a single combination of voltage frequency and amplitude in a haptic feedback control signal at block 718, the controller may pass a haptic feedback control signal to the piezoelectric element associated with the first key of the keyboard, via the first metal trace, to create haptic feedback to be heard and felt at the first key of the keyboard. For example, in an embodiment described with reference to FIG. 5, a single piezo element may be situated directly beneath a single key 504 on the cover sheet at which the user applies a downward force. In one such embodiment, only a single piezo element (not shown) situated directly beneath the point 504 may deform, causing the controller to register a keystroke. In such an embodiment, the controller may respond with a haptic feedback control signal that causes the single piezo element situated beneath key 504 to generate haptic movement feedback or haptic sound feedback the user can feel and hear. The controller in such an embodiment may perform a similar response each time a separate key of the keyboard is pressed while the user types. Thus, in such an embodiment, the user may perceive a separate haptic sound feedback and haptic movement feedback at each key, as the user presses those keys individually. The method may then end.

Figure 8:
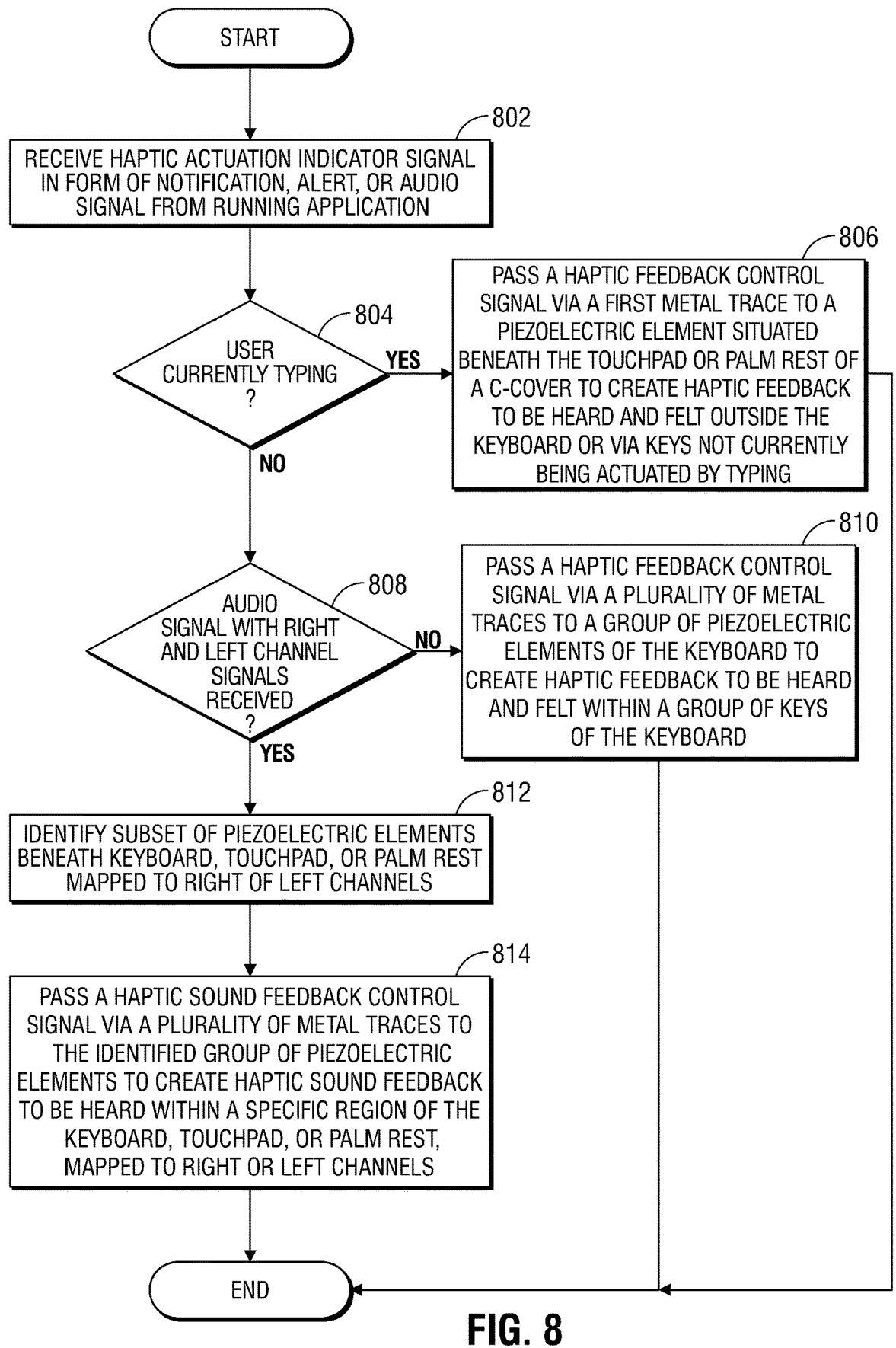
FIG. 8 is a flow diagram illustrating a method of generating a haptic sound feedback at a piezoelectric element according to an embodiment of the present disclosure.

FIG. 8 is a flow diagram illustrating a method of generating a haptic sound feedback at a piezoelectric element in response to haptic actuation indicator signals other than piezo actuation signals according to an embodiment of the present disclosure. As described herein, a haptic sound feedback or haptic tactile movement feedback may be generated in response to a received haptic actuation indicator signal, other than the piezo actuation signal received by the controller indicating the piezoelectric element has been deformed under mechanical stress. For example, the controller may transmit a haptic feedback control signal causing a piezoelectric element to generate a haptic sound feedback in response to receiving a notification from a software application currently running on the information handling system. Such a notification or alarm from the software application may be played via one or more piezoelectric elements in lieu of, or in addition to an audible sound played through the audio speakers of the information handling system in embodiments described herein. As another example, the controller may transmit the haptic feedback control signal to generate a haptic sound feedback at one or more piezoelectric elements in response to receiving an audio signal, including a right channel signal intended to play sound associated with video or images playing toward the right-hand side of the screen and a left channel signal intended to play sound associated with video or images playing toward the left-hand side of the screen. One or more piezoelectric elements or groups thereof in embodiments described herein may also be mapped to the right channel signal or the left channel signal, and the controller may transmit a haptic sound feedback control signal in response to the right channel signal or the left channel signal to the one or more piezoelectric elements mapped to that channel.

At block 802, the keyboard controller or processor may receive a notification, alert, or audio signal from an application currently running on the information handling system in an embodiment. As described herein, a haptic actuation indicator signal in an embodiment may be a piezo actuation signal received at the controller or processor, indicating a key situated above the piezoelectric element has been actuated by a user. In other embodiments, a haptic actuation indicator signal may comprise a notification or code instructions received at the processor or controller from a software application currently operating on the information handling system. For example, some applications may include alarms or notifications that may be set to make an audible sound via the haptic keyboard, rather than through the main speaker system of the information handling system. As another example, some applications may cause the haptic keyboard, in lieu of or in combination with the main speakers of the information handling system to emit sound in accordance with an audio signal having one or more channels for one or more speakers. Such notifications or audio signals in an embodiment may comprise a haptic actuation indicator signal. Further, in some embodiments an application may provide the haptic actuation indicator signal to generate tactile movement haptic feedback.

The keyboard controller may determine at block 804 in an embodiment whether a user is currently typing. While the user is currently typing, the controller may prioritize haptic movement feedback (e.g., tactile feel of using a traditional keyboard) over haptic sound feedback (e.g., buzzing to indicate an alarm associated with a running application) for the piezoelectric elements situated beneath the keyboard in some embodiments. Movement of the piezoelectric elements within the keyboard that are not coordinated with the user's typing in such a scenario, as may occur when using one or more of those piezoelectric elements to provide haptic sound feedback or tactile movement feedback not associated with the user's typing, may cause disorientation or an undesirable haptic experience. Thus, the controller may determine whether the user is currently typing in an embodiment to avoid such disorientation or undesirable effects. The controller may make such a determination based on the time that has elapsed since the most recent receipt of a piezo actuation signal from a plurality of the piezoelectric elements situated beneath the keyboard in an embodiment as compared to a limited subset of piezoelectric elements associated with a limited number of keys such as may be used with a gaming application. For example, if more than a preset time period (e.g., 30 seconds, two minutes, five minutes, ten minutes, etc.) has passed since the controller has last received such a piezo actuation signal from multiple keys depending on the type of application executing on the information handling system, the controller may determine the user is not currently typing. Further, the condition for determining if a user is currently typing may depend on application usage data indicating the type of application executing on the information handling system. For example, of a word processing application or an email application is being used, this may indicate typing is likely or a prominent action via the haptic keyboard of embodiments of the present disclosure. By contrast, application usage data indicating applications such as browsing or gaming applications may indicate typing is not likely occurring or that any typing activity is less prominent or important for that application. This may lead to a determination that typing is not currently occurring at 804. In some embodiments, this preset time period for multiple key actuation pauses may be set or customized by the user or by an application operating on the information handling system. If the controller determines the user is currently typing, the method may proceed to block 806 to cause the haptic sound feedback to occur at piezoelectric elements not situated beneath the keys of the keyboard. If the controller determines the user is not currently typing, the method may proceed to block 808.

At block 806, in an embodiment in which the keyboard controller has determined a user is currently typing, the keyboard controller may pass a haptic feedback control signal via a first metal trace to a piezoelectric element situated beneath the touchpad or palm rest of a C-cover to create haptic feedback to be heard and felt outside the keyboard. For example, in an embodiment described with reference to FIG. 5, in which the controller detects the user currently typing, or detects an actuation of several keys or the touchpad has occurred within a preset period of time (e.g., within a pause period of the last five minutes), the controller may transmit a haptic feedback control signal to a piezoelectric element situated within region 509, beneath the palm rest of the C-cover. One or more piezoelectric elements within region 509 may then produce the haptic sound feedback associated with receipt of the notification from the currently running application or other haptic actuation indicator signal. In another embodiment in which the keyboard controller has determined a user is currently typing, the keyboard controller may pass a haptic feedback control signal via a first metal trace to a piezoelectric element or elements situated beneath the keyboard but which are not currently being actuated by the typing activity to create haptic feedback to be heard or felt from within the keyboard. For example, in an embodiment described with reference to FIG. 5, in which the controller detects the user currently typing and detects which keys are currently actuated during typing, the controller may transmit a haptic feedback control signal to one or more piezoelectric element situated within keyboard 501, that are not at that time during typing activity being actuated. One or more piezoelectric elements within region 501 may then produce the haptic sound feedback associated with receipt of the notification from the currently running application or other haptic actuation indicator signal while the actuated haptic keys are providing tactile movement and potentially other sound haptic feedback. In such a way, the controller may use piezoelectric elements situated outside the keyboard to produce an audible notification, without altering the haptic movement feedback and haptic sound feedback from the piezoelectric elements situated beneath the multiple keys of the keyboard initiated in response to a received actuation signal. The method in such an embodiment may then end.

The keyboard controller may determine at block 808 in an embodiment in which the user is not currently typing whether the signal received at block 802 includes a multi-channel audio signal. For example, a speaker system of an information handling system may include an audio controller that controls the level of audio played in each speaker of the information handling system based on the placement of the speaker with respect to the user, and upon an embedded multi-channel audio signal within the streaming video or streaming audio indicating the directionality of the audio to be played. For example, the embedded audio signal may instruct a sound of an explosion shown on the right side of the screen to be played predominantly through speakers situated to the right side of the viewer. Such an audio signal may include multiple channels, with each channel mapped to one or more speakers of the information handling system. In embodiments described herein, one or more piezoelectric elements of the haptic keyboard may be mapped to one or more of these channels. If the haptic actuation indicator signal received at block 802 is an audio signal including a plurality of such channels, the method may proceed to block 812 to identify piezoelectric elements mapped to the channels of such an audio signal. If the haptic actuation indicator signal received at block 802 is not an audio signal including a plurality of such channels, and the user is not currently typing, the method may proceed to block 810 to cause a haptic sound feedback to occur at piezoelectric elements situated beneath the keys of the keyboard.

At block 810, in an embodiment in which the signal received at block 802 does not include a multi-channel audio signal, the keyboard controller may pass a haptic feedback control signal via a plurality of metal traces to a group of piezoelectric elements of the keyboard to create a haptic feedback to be heard or felt within any group of keys of the keyboard. Such a haptic sound feedback may be made in response to receipt of a haptic actuation indicator signal such as an alarm or other notification associated with a running application, for example. As described herein, using the piezoelectric elements situated beneath the keyboard to play such an alarm or notification may be disorienting if the user is currently using the keyboard to type on keys utilizing the same piezoelectric elements. However, in an embodiment in which the user is not currently typing, piezoelectric elements situated beneath the keyboard, touchpad, or C-cover may be used to provide such haptic sound feedback. For example, in an embodiment described with reference to FIG. 5, any one or a plurality of piezoelectric elements situated beneath the keyboard 501, the touchpad 502, or the C-cover 505 outside the keyboard 501 and touchpad 502 (e.g., under palm rest 509) may be used. The method may then end in such an embodiment.

The keyboard controller in an embodiment in which the signal received at block 802 includes an audio signal with sound directionality instructions may identify a subset of piezoelectric elements situated beneath the keyboard, touchpad, or palm rest associated with one or more of the channels in the audio signal. For example, in a traditional 5.1 channel surround sound system, an audio signal may include five channels—a center channel, a front right channel, a front left channel, a rear right channel, and a rear left channel. The center channel may be mapped to a speaker situated in the center of the viewing area (e.g., twelve o'clock from the viewer's perspective), the right front channel at roughly two o'clock, the right rear channel at roughly four o'clock, and so forth in a clockwise manner. In embodiments of the present disclosure, one or more piezoelectric elements or groups of piezoelectric elements within the haptic keyboard may be mapped to one of these channels.

For example, in an embodiment described with reference to FIG. 5, the piezoelectric elements situated within the region 507 in an embodiment may be mapped to the right rear channel of a 5.1 surround sound audio signal, while the piezoelectric elements situated within the region 508 may be mapped to the left rear channel. As another example, the piezoelectric elements situated within the region 507 in an embodiment may be mapped to the right front channel of a 5.1 surround sound audio signal, while the piezoelectric elements situated within the region 508 may be mapped to the left front channel. In still other examples, the piezoelectric elements situated within the region 507 in an embodiment may be mapped to a limited subset of the frequency range for sounds played within either the right front channel or the right rear channel.

At block 814, the keyboard controller in an embodiment may pass a haptic feedback control signal via a plurality of metal traces to the group of piezoelectric elements of the keyboard identified at block 812 to create haptic feedback to be heard within a specific region of the keyboard, touchpad or palm rest, in accordance with the received sound directionality instructions. For example, in an embodiment described with reference to FIG. 5, if a user is streaming video that supports such surround sound effects on the information handling system, the keyboard controller may instruct the piezoelectric elements situated within specific region correlating to that region's mapped channel according to the received audio signal. For example, if the embedded audio signal associates speakers situated to the right side of the viewer with a right channel in an embodiment, the keyboard controller may transmit a haptic feedback control signal to cause the group of piezoelectric elements within region 507, to the right of the screen, to generate a haptic sound feedback in tandem with the sound played through the speakers on the right side of the information handling system. In such a way, the piezoelectric elements in embodiments of the present disclosure may generate haptic sound feedback to enhance user experience while typing, and to enhance user experience of other audible sounds traditionally generated through the speakers of the information handling system. The method may then end.

The blocks of the flow diagrams of FIGS. 7 and 8 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A haptic keyboard of an information handling system, comprising:
a coversheet to identify a key location of the haptic keyboard;
a support layer;
a contact foil placed between the coversheet and support layer;
a controller of the information handling system operatively coupled to the contact foil to:
receive a haptic actuation indicator signal via a processor or via the contact foil;
send a first haptic feedback control signal to a first piezoelectric element placed between the contact foil and the support layer to cause the first piezoelectric element to generate haptic tactile movement feedback at the key location in response to the haptic actuation indicator signal; and
send a second haptic feedback control signal to a second piezoelectric element placed between the contact foil and the support layer to cause the second piezoelectric element to generate haptic sound feedback at a second location of the second piezoelectric element.

2. The haptic keyboard of claim 1, wherein the second piezoelectric element is adjacent to the first piezoelectric element in an array of piezoelectric elements under keys of the haptic keyboard to generate the haptic sound feedback at the second location near the key location.

3. The haptic keyboard of claim 1, wherein the second piezoelectric element is the same as the first piezoelectric element and the first haptic feedback control signal and the second haptic feedback control signal are a combined haptic feedback control signal generate the haptic tactile movement feedback and the haptic sound feedback at the key location.

4. The haptic keyboard of claim 1, wherein the haptic tactile movement feedback is generated according to settings received from an application operating on a processor of the information handling system.

5. The haptic keyboard of claim 1, wherein the haptic tactile movement feedback is generated according to a user-specified movement intensity level.

6. The haptic keyboard of claim 1, wherein the second haptic feedback control signal has a frequency and a magnitude associated with a haptic sound feedback specified by settings received from an application operating on a processor of the information handling system.

7. The haptic keyboard of claim 1 further comprising:
the first piezoelectric element to receive an applied mechanical stress at the key location of the coversheet and generate a piezo actuation signal;
wherein the piezo actuation signal is the haptic actuation indicator signal.

8. The haptic keyboard of claim 1, wherein the haptic actuation indicator signal is a notification from a software application currently operating on the information handling system further comprising:
the controller determining the haptic keyboard is in use for typing; and
wherein the second piezoelectric element is situated beneath a palm rest in a C-cover or a haptic touchpad of the information handling system.

9. The haptic keyboard of claim 1, wherein the haptic actuation indicator signal is a notification from a software application currently operating on the information handling system further comprising:
the controller determining the haptic keyboard is in use for typing; and
wherein the second piezoelectric element is a keyboard piezoelectric element not currently actuated during typing during the haptic sound feedback event.

10. A method of providing haptic sound feedback via a haptic keyboard, comprising:
receiving a haptic actuation indicator signal via a controller of the haptic keyboard;
determining, via a haptic feedback keyboard and touchpad control system executing code instructions, a haptic sound feedback control signal for an operating application on a processor of the information handling system and associated with one or more haptic sound feedback settings in a memory;
sending one or more haptic feedback control signals having the haptic sound feedback control signal, via the controller, to one or more of a plurality of piezoelectric elements placed between a contact foil and a support layer of the haptic keyboard and situated beneath the haptic keyboard;
receiving a first of the one or more haptic feedback control signals at a first piezo electric element of the plurality of piezoelectric elements of the haptic keyboard; and
generating haptic sound feedback according to the one or more haptic sound feedback settings of the operating application at the first of the plurality of piezoelectric elements in response to the haptic actuation indicator signal.

11. The method of claim 10 further comprising:
determining a haptic tactile movement feedback control signal for an operating application associated with one or more haptic tactile movement feedback settings;
determining that the haptic tactile movement feedback control signal may be combined with the haptic sound feedback control signal; and
generating haptic tactile movement feedback at the first of the plurality of piezoelectric elements with the haptic feedback control signal including the haptic tactile movement feedback control signal and the haptic sound control signal combined.

12. The method of claim 10 further comprising:
determining a haptic tactile movement feedback control signal for an operating application associated with one or more haptic tactile movement feedback settings;
determining the haptic tactile movement feedback control signal is not combinable with the haptic sound feedback control signal;
receiving a second of the one or more haptic feedback control signals having the haptic tactile movement feedback control signal at a second piezoelectric element of the plurality of piezoelectric elements; and
generating haptic tactile movement feedback at the second piezoelectric element of the plurality of piezoelectric elements.

13. The method of claim 10 further comprising:
receiving an applied mechanical stress at a key location of a coversheet situated above the first piezoelectric element of the plurality of piezoelectric elements of the haptic keyboard; and transmitting the haptic actuation indicator signal via the contact foil from the first piezoelectric element of the plurality of piezoelectric elements to the controller in response.

14. The method of claim 10 further comprising:
receiving a code instruction from the application currently operating on the information handling system via the processor;
associating an application notification with the haptic actuation indicator signal via the processor; and
transmitting the haptic actuation indicator signal via the processor to the controller.

15. The method of claim 10 further comprising:
determining, via the processor, the haptic actuation indicator signal is an audio signal including a right channel signal; and
determining the right channel signal is mapped to the first piezoelectric element of the plurality of piezoelectric elements of the haptic keyboard.

16. The method of claim 15 further comprising:
determining, via the processor, the haptic actuation indicator signal is an audio signal including a left channel signal; and
determining the left channel signal is mapped to a second piezoelectric element of the plurality of piezoelectric elements of the haptic keyboard.

17. A haptic keyboard of an information handling system, comprising:
a coversheet to identify a key location of the haptic keyboard;
a support layer;
a contact foil placed between the coversheet and support layer;
a controller of the information handling system operatively coupled to the contact foil to:
receive a haptic actuation indicator signal via the contact foil;
send a haptic tactile movement control signal as part of a combined haptic feedback control signal to a piezoelectric element placed between the contact foil and the support layer to cause the first piezoelectric element to generate haptic tactile movement feedback at the key location in response to the haptic actuation indicator signal; and
send a haptic sound control signal as part of the combined haptic feedback control signal to the piezoelectric element to cause the piezoelectric element to generate haptic sound feedback at the key location in response to the haptic actuation indicator signal.

18. The haptic keyboard of claim 17 further comprising:
the first piezoelectric element to receive an applied mechanical stress at the key location of the coversheet and generate a piezo actuation signal,
wherein the haptic actuation indicator signal is the piezo actuation signal.

19. The haptic keyboard of claim 17, wherein the wherein the haptic sound feedback is generated according to settings received from an application operating on a processor of the information handling system.

20. The haptic keyboard of claim 17, wherein the haptic sound feedback is generated according to settings received for a user-specified sound volume level.

* * * * *